United States Patent
Taguchi et al.

(10) Patent No.: US 9,910,846 B2
(45) Date of Patent: Mar. 6, 2018

(54) CONVERSION DEVICE AND CONVERSION METHOD

(71) Applicant: FUJITSU LIMITED, Kawasaki-shi, Kanagawa (JP)

(72) Inventors: Akinori Taguchi, Kawasaki (JP); Jaikrishna Mohanakrishnan, Kawasaki (JP); Satoshi Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/137,461

(22) Filed: Apr. 25, 2016

(65) Prior Publication Data
US 2016/0321240 A1    Nov. 3, 2016

(30) Foreign Application Priority Data
May 1, 2015    (JP) ................................. 2015-094221

(51) Int. Cl.
*G06F 17/00*    (2006.01)
*G06F 17/27*    (2006.01)
(Continued)

(52) U.S. Cl.
CPC ............ *G06F 17/276* (2013.01); *G06F 3/013* (2013.01); *G06F 3/018* (2013.01); *G06F 3/0237* (2013.01);
(Continued)

(58) Field of Classification Search
CPC .......................... G06F 17/30684; G06F 3/0237
See application file for complete search history.

(56) References Cited

U.S. PATENT DOCUMENTS 4,755,955 A * 7/1988 Kimura ................... G06T 11/60
                                                          345/667
5,357,431 A * 10/1994 Nakada ............. G06F 17/30985
                                                      707/999.006
(Continued)

FOREIGN PATENT DOCUMENTS

JP    61-214508 A    9/1986
JP    10-91378 A    4/1998
(Continued)

OTHER PUBLICATIONS

European Search Report dated Oct. 11, 2016, issued in counterpart European Patent Application No. 16167049.2. (6 pages).

*Primary Examiner* — Laurie A Ries
(74) *Attorney, Agent, or Firm* — Westerman, Hattori, Daniels & Adrian, LLP

(57) ABSTRACT

A conversion device includes an input unit configured to input position information of a user's line of sight on a screen; an acquiring unit configured to acquire, a character string included in a predetermined range from a position indicated by the position information, among character strings displayed on the screen; and a display control unit configured to display a list of character strings corresponding to readings including an input character as conversion candidates of the input character, among stored character strings, the list being displayed in response to the input character being input by the user. The display control unit increases a priority in a display order in the list for a character string that matches any of the acquired character strings, such that the priority is higher than that of a case where the character string does not match any of the character strings acquired by the acquiring unit.

15 Claims, 25 Drawing Sheets

(51) Int. Cl.
*G06F 17/30* (2006.01)
*G06F 3/01* (2006.01)
*G06K 9/18* (2006.01)
*G06F 3/023* (2006.01)

(52) U.S. Cl.
CPC ...... *G06F 17/2735* (2013.01); *G06F 17/2755* (2013.01); *G06F 17/30684* (2013.01); *G06K 9/18* (2013.01)

(56) References Cited

U.S. PATENT DOCUMENTS

| | | | | |
|---|---|---|---|---|
| 5,831,594 | A * | 11/1998 | Tognazzini | G06F 3/013 345/156 |
| 5,835,924 | A * | 11/1998 | Maruyama | G06F 17/2863 715/264 |
| 6,253,218 | B1 * | 6/2001 | Aoki | G06F 17/30126 707/999.007 |
| 7,013,258 | B1 * | 3/2006 | Su | G06F 3/013 345/171 |
| 8,497,880 | B2 * | 7/2013 | Victor | B60Q 9/008 345/660 |
| 8,903,835 | B2 * | 12/2014 | Kikuchi | G06F 17/3087 707/749 |
| 9,256,363 | B2 * | 2/2016 | Sudo | G06F 3/04883 |
| 9,348,424 | B2 * | 5/2016 | Matsuzawa | G06F 3/0237 |
| 2003/0212674 | A1 * | 11/2003 | Nakagawa | G06F 17/273 |
| 2007/0040799 | A1 * | 2/2007 | Singh | G06F 3/013 345/156 |
| 2007/0283255 | A1 * | 12/2007 | Kina | G06F 17/30719 715/264 |
| 2009/0278853 | A1 * | 11/2009 | Ueda | G06F 17/2735 345/581 |
| 2013/0278625 | A1 * | 10/2013 | Obata | G06F 3/013 345/619 |
| 2013/0300654 | A1 * | 11/2013 | Seki | G06F 3/013 345/156 |
| 2013/0300669 | A1 * | 11/2013 | Matsuzawa | G06F 3/0237 345/168 |
| 2013/0325463 | A1 * | 12/2013 | Greenspan | G06F 3/013 704/235 |
| 2014/0125558 | A1 * | 5/2014 | Miyajima | G06F 17/289 345/8 |
| 2015/0261741 | A1 * | 9/2015 | Ueda | G06F 17/30684 704/10 |

FOREIGN PATENT DOCUMENTS

| | | |
|---|---|---|
| JP | 11-85452 A | 3/1999 |
| JP | 2002-324064 A | 11/2002 |
| JP | 2009-266010 A | 11/2009 |
| JP | 2010-267071 A | 11/2010 |
| JP | 2010-271938 A | 12/2010 |
| JP | 2012-252629 A | 12/2012 |
| JP | 2014-93050 A | 5/2014 |

* cited by examiner

FIG.7

| REFERENCE WORD | RECTANGLE COORDINATES | FIXATION POINT | DISTANCE | TIME AND DATE |
|---|---|---|---|---|
| Lorem | (0,0) – (100,100) | (140,50) | ... | 2014-01-05 9:15:02 |
| Ipsum | (120,0) – (220,100) | (140,50) | ... | 2014-01-05 9:15:02 |
| Dolor | (250,0) – (350,100) | (140,50) | ... | 2014-01-05 9:15:02 |

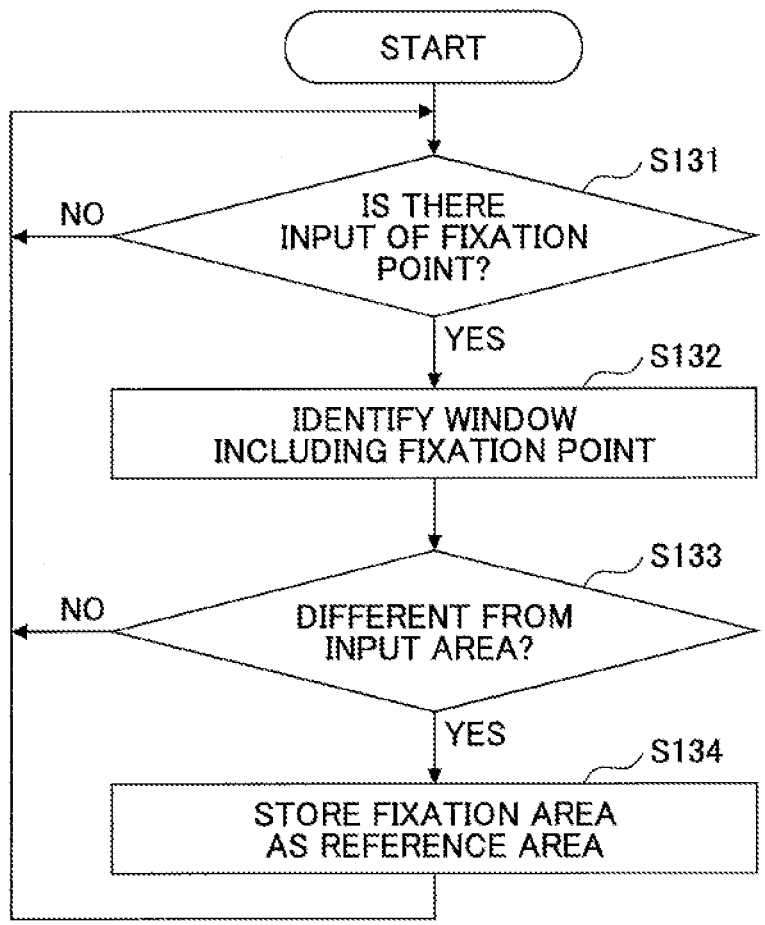

FIG.12

| TIME AND DATE | READING STYLE |
|---|---|
| 2015-02-01 10:10:10.100 | SKIM THROUGH |
| 2015-02-01 10:10:10.300 | SKIM THROUGH |
| 2015-02-01 10:10:10.600 | READ THOROUGHLY |

FIG.14

| CONDITION | ACTION |
|---|---|
| WORD WHOSE DISTANCE FROM FIXATION POINT IS LESS THAN OR EQUAL TO α | SET AS TARGET |
| PARTICLE, SYMBOL | DO NOT SET AS TARGET |

FIG.15

| CONDITION | ACTION |
|---|---|
| READING STYLE = READ THOROUGHLY | TEMPORARY PRIORITY +100 FOR ALL REFERENCE WORDS |
| READING STYLE = SKIM THROUGH | TEMPORARY PRIORITY +100 FOR REFERENCE WORD FIXATED AT LAST |

FIG.16

| WORD | READING | STANDARD PRIORITY | TEMPORARY PRIORITY | TEMPORARY PRIORITY UPDATE TIME AND DATE |
|---|---|---|---|---|
| ⋮ | ⋮ | ⋮ | ⋮ | ⋮ |
| SPRING (DISPLAYED AS CHINESE CHARACTER) | haru | 55 | 0 | 2014-01-01 12:55:35 |
| ⋮ | ⋮ | ⋮ | ⋮ | ⋮ |
| SECURITY (DISPLAYED AS CHINESE CHARACTER) | hoshou, hosyou | 25 | 100 | 2014-01-02 22:12:45 |
| ⋮ | ⋮ | ⋮ | ⋮ | ⋮ |
| http://www.○△□.com | http://www.○△□.com, www.○△□.com, ○△□.com | 0 | 100 | 2014-01-03 09:12:10 |
| ⋮ | ⋮ | ⋮ | ⋮ | ⋮ |

| CONDITION | READING GENERATION METHOD |
|---|---|
| URL BEGINNING WITH http:// | ENTIRE URL, CHARACTER STRING OF URL OTHER THAN http:// |
| 10 DIGIT TELEPHONE NUMBER | 10 DIGIT TELEPHONE NUMBER, NUMBER STRING OTHER THAN AREA CODE |
| RUBY APPENDED | RUBY |

FIG.19

| KEY CODE | ACTION |
|---|---|
| Enter | CONFIRMATION |
| Escape | CANCELLATION |

130

| CONDITION | ACTION |
|---|---|
| WORD WHOSE DISTANCE FROM FIXATION POINT IS LESS THAN OR EQUAL TO $\alpha$ | SET AS TARGET |
| PARTICLE, SYMBOL | DO NOT SET AS TARGET |
| WORD HAVING 75% OR MORE OF ITSELF INCLUDED IN REFERENCE AREA | SET AS TARGET |

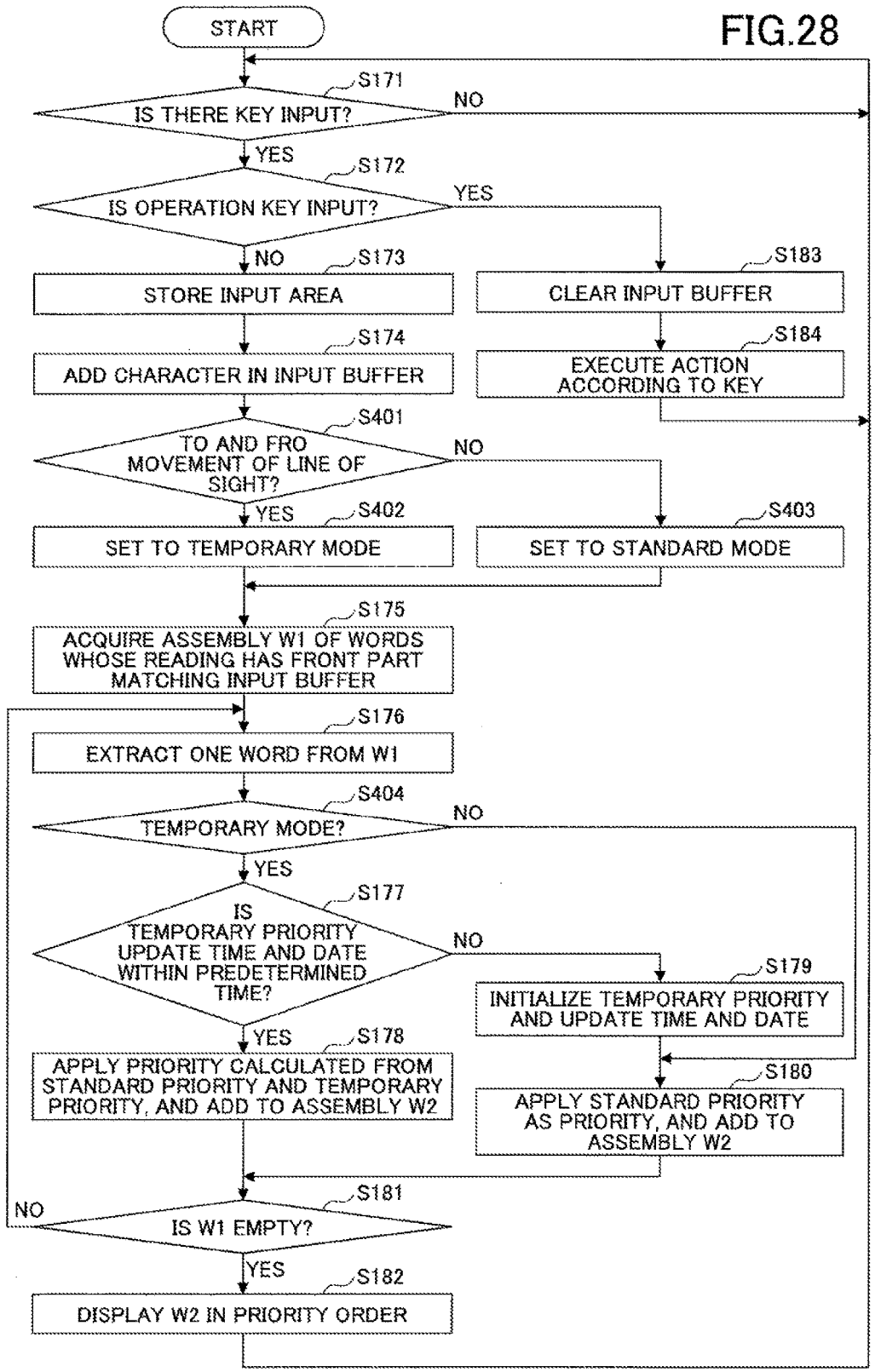

CONVERSION DEVICE AND CONVERSION METHOD

CROSS-REFERENCE TO RELATED APPLICATION

This patent application is based upon and claims the benefit of priority of the prior Japanese Patent Application No. 2015-094221 filed on May 1, 2015, the entire contents of which are incorporated herein by reference.

FIELD

The embodiments discussed herein are related to a conversion device and a conversion method.

BACKGROUND

There is a function of displaying a list of character strings that are conversion candidates based on characters, when a user inputs the characters in a PC (Personal Computer), a mobile phone, a smartphone, a tablet terminal, etc. The user may input the character string by selecting a conversion candidate from the list.

The convenience of this function significantly depends on the order in which the conversion candidates are displayed. For example, when a character string, which the user intends to input, is displayed at a high ranking, the user is able to select the conversion candidate corresponding to the character string by a few operations.

Accordingly, as a method of determining the order of displaying the conversion candidates, there is a method of displaying character strings that are frequently input at a high ranking, based on the past input history of the user. Furthermore, studies are made for determining the order of displaying the conversion candidates according to the frequency of outputting content data items, when displaying words included in the content data items used by the user as conversion candidates (see, for example, Patent Document 1).

Patent Document 1: Japanese Laid-Open Patent Publication No. 2010-271938

SUMMARY

According to an aspect of the embodiments, a conversion device includes a processor configured to execute a process including inputting position information of a user's line of sight on a screen, acquiring a character string included in a predetermined range front a position indicated by the position information, among character strings displayed on the screen, and displaying a list of character strings corresponding to readings including an input character, among character strings stored in a storage unit in association with the readings, the list of character strings being displayed as conversion candidates with respect to the input character, the list being displayed in response to the input character being input by the user, wherein the displaying includes increasing a priority in a display order for a character string that matches any of the character strings acquired at the acquiring, among the character strings corresponding to the readings in the list, such that the priority is higher than a priority of a case where the character string does not match any of the character strings acquired at the acquiring.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 7 illustrates an example of a configuration of a reference word storage unit;

FIG. 9 is a flowchart of an example of processing procedures executed by a reference area identifying unit according to the first embodiment;

FIG. 10 illustrates an example of a configuration of a fixation area storage unit;

FIG. 12 illustrates an example of a configuration of a reading style storage unit;

FIG. 14 illustrates an example of extraction rules according to the first embodiment;

FIG. 15 illustrates an example of priority rules according to the first embodiment;

FIG. 16 illustrates an example of a candidate dictionary storage unit;

FIG. 17 illustrates an example of a reading generation rule;

FIG. 19 illustrates an example of a configuration of an operation key storage unit;

FIG. 28 is a flowchart of an example of processing procedures executed by the conversion candidate display unit according to the fourth embodiment.

DESCRIPTION OF EMBODIMENTS

There are cases where the user inputs a character string by referring to a document (for example, a document displayed next to the window that is the input destination) that is presented at a position different from the area that is the input destination (for example, a window, etc.). In this case, the document being referred to may include a character string that the user has never input in the past. Thus, the character string that the user intends to input is unlikely to be displayed at a high ranking in the list of conversion candidates, when the display order is determined based on the past input history and the frequency of outputting content data items.

Figure 1:
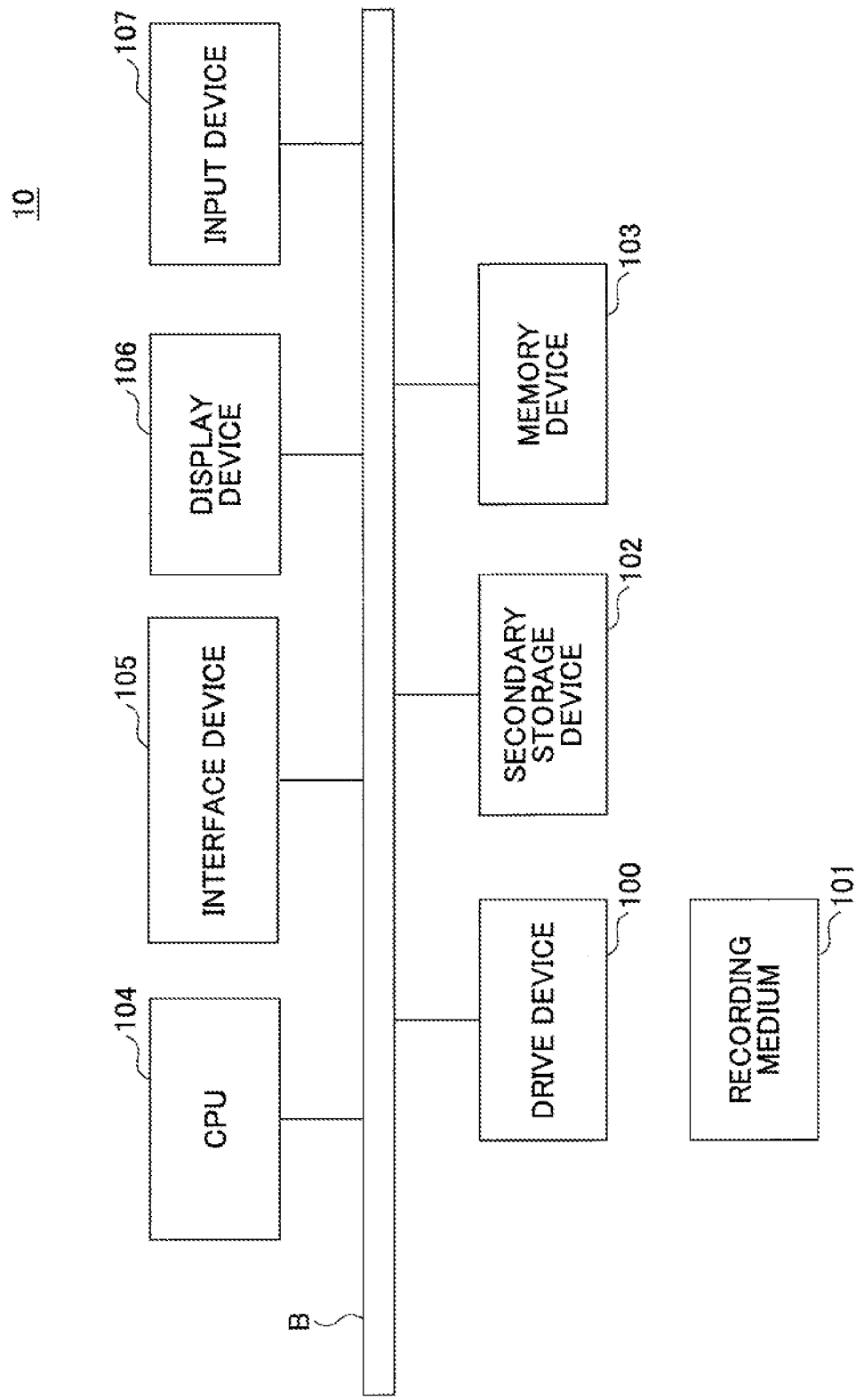
FIG. 1 is an example of a hardware configuration of a conversion device according to a first embodiment.

In the following, a first embodiment is described with reference to accompanying drawings. FIG. 1 is an example of a hardware configuration of a conversion device according to the first embodiment. A conversion device 10 illustrated in FIG. 1 includes a drive device 100, a secondary storage device 102, a memory device 103, a CPU 104, an interface device 105, a display device 106, an input device 107, etc., which are connected to each other by a bus B.

Programs that realize processes in the conversion device 10 are provided by a recording medium 101. When a recording medium 101 recording a program is set in the drive device 100, the program is installed in the secondary storage device 102 from the recording medium 101 via the drive device 100. However, the program does not need to be installed from the recording medium 101; the program may be downloaded from another computer via a network. The secondary storage device 102 stores installed programs and files, data, etc., that are needed.

The memory device 103 reads a program from the secondary storage device 102 and stores the program, when an instruction to activate the program is received. The CPU 104 implements functions relevant to the conversion device 10 according to programs stored in the memory device 103. The interface device 105 is used as an interface for connecting to the network. The display device 106 displays a GUI (Graphical User Interface), etc., according to programs. The input device 107 includes a keyboard, a mouse, etc., and is used for inputting various operation instructions.

Note that examples of the recording medium 101 are portable recording media such as a CD-ROM, a DVD disk, a USB memory, etc. Furthermore, examples of the secondary storage device 102 are a HDD (Hard Disk Drive), a flash memory, etc. The recording medium 101 and the secondary storage device 102 both correspond to a computer-readable recording medium.

Figure 2:
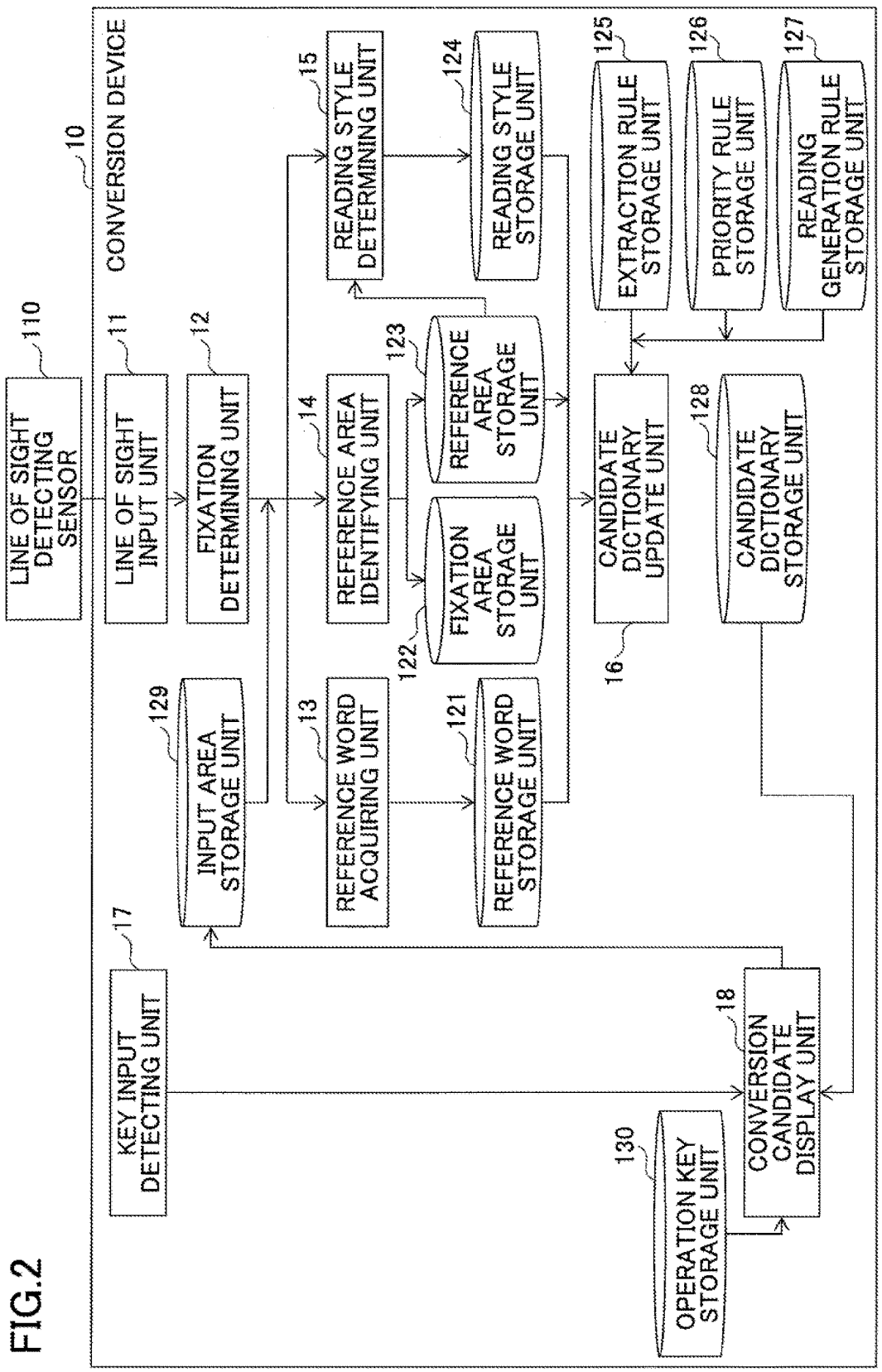
FIG. 2 illustrates an example of a functional configuration of the conversion device according to the first embodiment.

FIG. 2 illustrates an example of a functional configuration of the conversion device 10 according to the first embodiment. In FIG. 2, the conversion device 10 includes a line of sight input unit 11, a fixation determining unit 12, a reference word acquiring unit 13, a reference area identifying unit 14, a reading style determining unit 15, a candidate dictionary update unit 16, a key input detecting unit 17, a conversion candidate display unit 18, etc. These functional units are realized by processes that the CPU 104 is caused to execute by one or more programs installed in the conversion device 10. Furthermore, the conversion device 10 uses a reference word storage unit 121, a fixation area storage unit 122, a reference area storage unit 123, a reading style storage unit 124, an extraction rule storage unit 125, a priority rule storage unit 126, a reading generation rule storage unit 127, a candidate dictionary storage unit 128, an input area storage unit 129, an operation key storage unit 130, etc. These storage units may be realized by, for example, using a storage device, etc., that may be connected to the secondary storage device 102 of the conversion device 10 via the network. The units illustrated in FIG. 2 are described with reference to FIG. 3.

Figure 3:
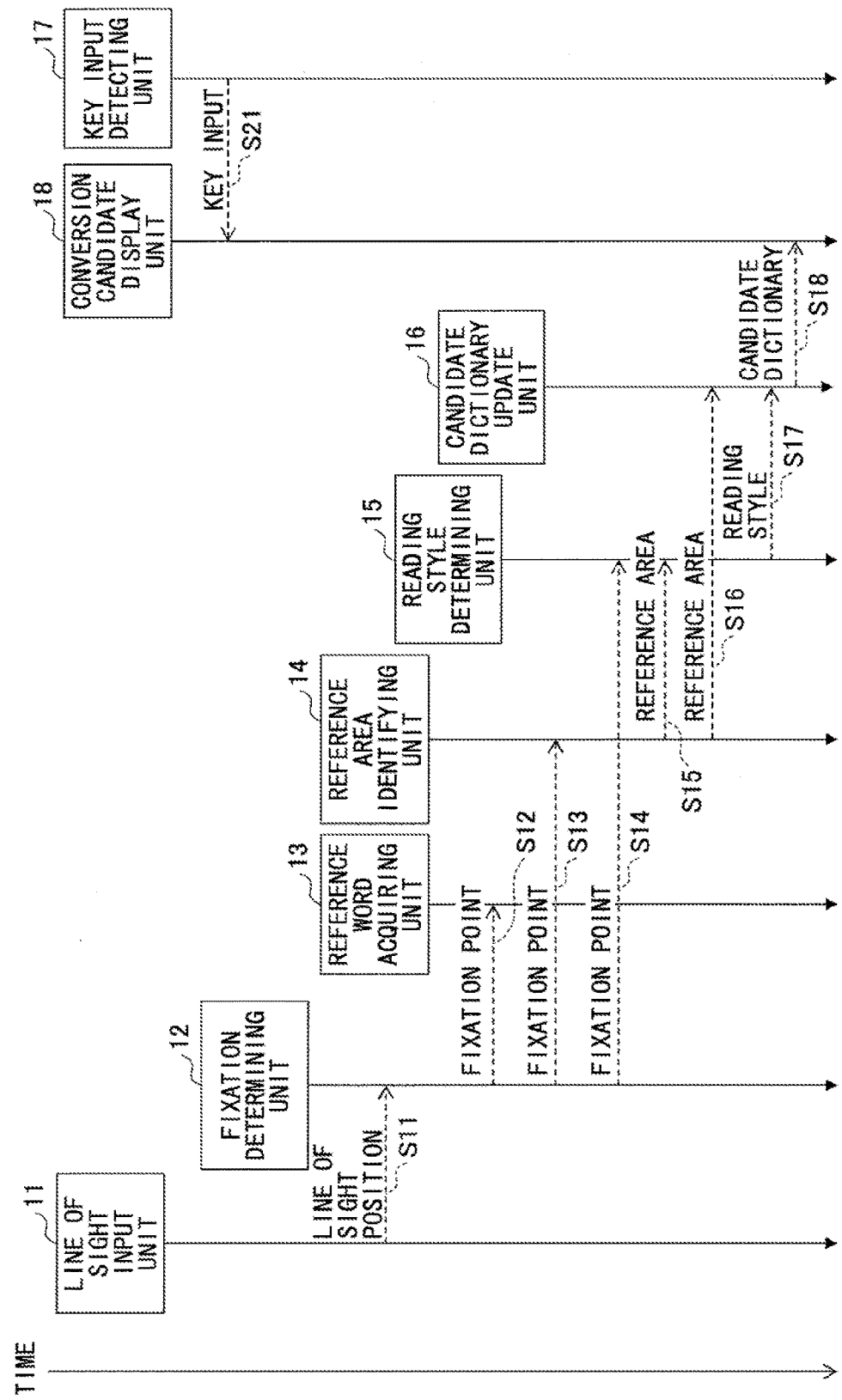
FIG. 3 illustrates the overall flow of processing procedures executed by the conversion device.

FIG. 3 illustrates the overall flow of processing procedures executed by the conversion device 10. In FIG. 3, the position of a rectangle including the name of each functional unit, in the perpendicular direction, indicates the anteroposterior relationship of timings of starting processes by the respective functional units. That is, in FIG. 3, a rectangle positioned above another rectangle starts a process before the other rectangle. For example, FIG. 3 indicates that the line of sight input unit 11, the key input detecting unit 17, and the conversion candidate display unit 18 start processes before the fixation determining unit 12. Furthermore, FIG. 3 indicates that the fixation determining unit 12 starts a process before the reference word acquiring unit 13 and the reference area identifying unit 14. Furthermore, FIG. 3 indicates that the reference word acquiring unit 13 and the reference area identifying unit 14 start processes before the reading style determining unit 15. Furthermore, FIG. 3 indicates that the timing of starting a process by the candidate dictionary update unit 16 is last. Note that the processes of the function units are executed in parallel.

Furthermore, in FIG. 3, the arrows in the horizontal direction indicate information that is supplied from the function unit at the starting point of the arrow (the origin of the arrow) to the function unit at the ending point of the arrow (the tip of the arrow).

The line of sight input unit 11 inputs, from a line of sight detecting sensor 110, coordinate values indicating the position of the line of sight of the user of the conversion device 10, which is detected by the line of sight detecting sensor 110. The line of sight detecting sensor 110 may be, for example, a camera, etc., or an eyeglass type device. The line of sight may be detected by using a known technology.

The line of sight input unit 11 continuously inputs coordinate values indicating the position of the line of sight of the user (hereinafter, simply referred to as a "line of sight position") detected by the line of sight detecting sensor 110, in the fixation determining unit 12 (step S11). Mote that the line of sight position is a position on the screen of the display device 106. The value of the line of sight position may be calibrated in advance, such that, for example, the top left of the screen of the display device 106 is (0, 0) and the bottom right are predetermined values.

The fixation determining unit 12 determines whether there is a fixation by the user and also determines the fixated position (hereinafter, "fixation point"), based on the line of sight positions that are continuously input. Every time the fixation determining unit 12 determines that a fixation has occurred, the fixation determining unit 12 inputs the position information of the fixation point to the reference word acquiring unit 13, the reference area identifying unit 14, and the reading style determining unit 15 (steps S12 through 14).

Note that a fixation means, for example, continuously looking at substantially the same position for more than a predetermined time (for example, several tens of milliseconds). In the present embodiment, a fixation is considered to be an act by the user for comprehending the information displayed on the screen. Therefore, continuously looking at substantially the same position may be interpreted that, for example, the movement speed of the line of sight position is about the general speed of a human being who is comprehending described matter.

The reference word acquiring unit 13 acquires a word that is positioned near a fixation point in a screen (hereinafter, "reference word"), every time position information of a fixation point is input, and stores the acquired reference word in the reference word storage unit 121. That is, it is determined that a word near the fixation point is a word that is referred to by the user. Note that being fixated does not have to be included as an essentiality for being a word that is referred to by a user. In this case, a word near the position of the line of sight may be determined as the reference word, without determining whether a fixation has occurred.

The reference area identifying unit 14 identifies a reference area in the screen of the display device 106. A reference area is a concept that is paired with an input area. That is, an input area is an area where the user is inputting a character string. A reference area is an area displaying information that is referred to by the user, when the user is inputting a character string in the input area. For example, when a user is referring to a document being displayed in a certain area while inputting a character string in another area, the certain area is the reference area and the other area is the input area.

Figure 4:
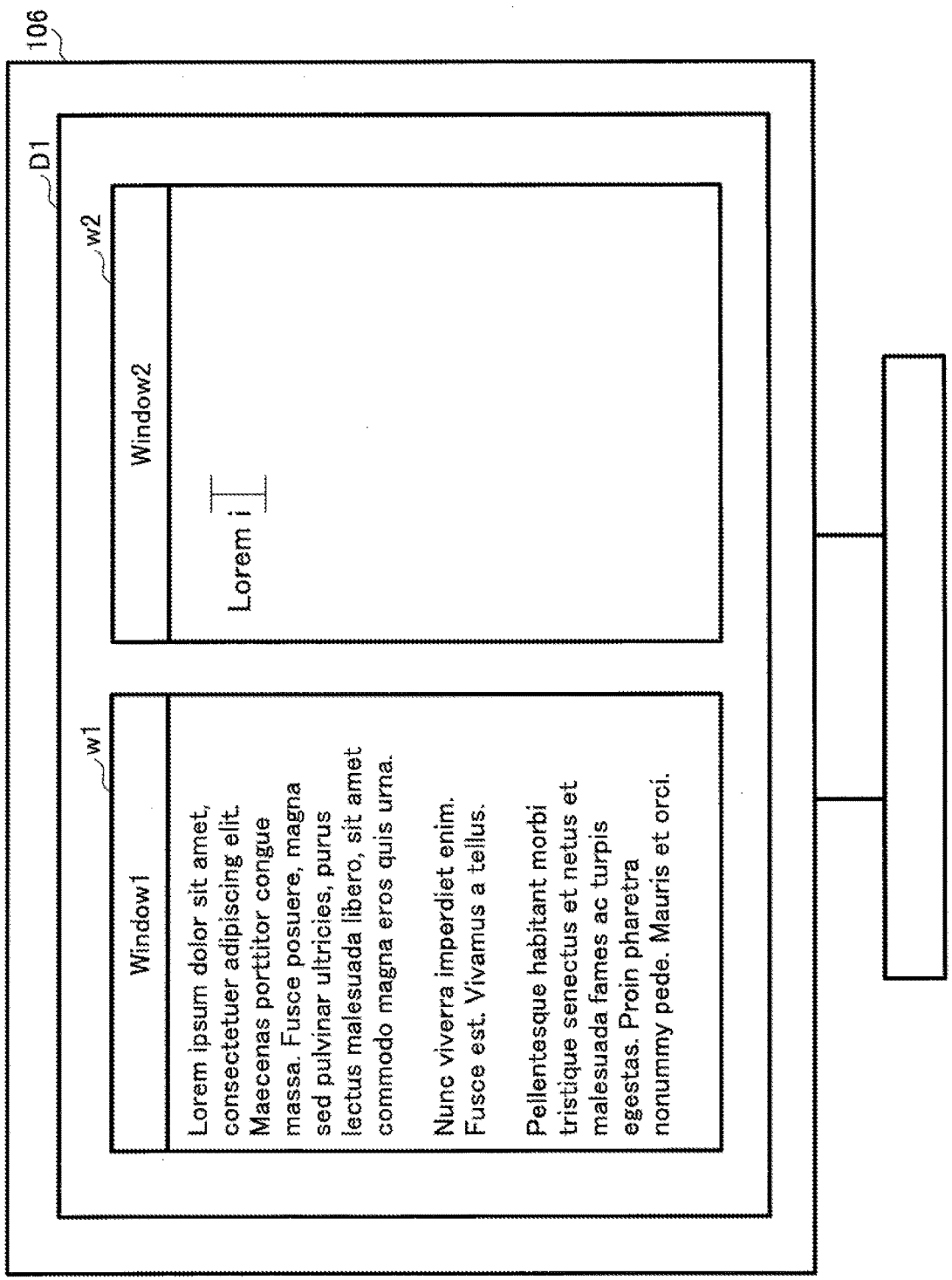
FIG. 4 illustrates a first example of an input area and a reference area according to the first embodiment.

FIG. 4 illustrates a first example of an input area and a reference area according to the first embodiment. FIG. 4 illustrates a state where a window w1 and a window w2 are displayed on a screen D1 of the display device 106. Here, the window w2 is a window in which a character string is input. Meanwhile, the window w1 is a window displaying the information that is referred to when inputting a character string in the window w2. That is, in the present embodiment, the input area and the reference area are distinguished in units of windows.

Note that the reference area identifying unit 14 stores information indicating an identified reference area, in the reference area storage unit 123. The information stored in the reference area storage unit 123 is input to the reading style determining unit 15 and the candidate dictionary update unit 16 (steps S15, S16).

The reading style determining unit 15 determines the reading style based on an N number of past fixation points in the reference area, every time position information of a fixation point is input, and stores the determination result in the reading style storage unit 124. A reading style means the style of the user reading the information displayed on the screen D1 (how the information is read), such as skim through, read thoroughly, etc. The reading style determining unit 15 stores the information indicating the reading style that is the determination result, in the reading style storage unit 124. The information indicating the reading style stored in the reading style storage unit 124 is input in the candidate dictionary update unit 16 (step S17).

The candidate dictionary update unit 16 refers to the reference word storage unit 121, the reference area storage unit 123, the reading style storage unit 124, the extraction rule storage unit 125, the priority rule storage unit 126, the reading generation rule storage unit 127, etc., and updates the priority, etc., of words stored in the candidate dictionary storage unit 128. The priority is the priority relevant to the order of displaying the conversion candidates when candidates of predictive conversion (hereinafter, "conversion candidates") are displayed, based on characters input by the user. Note that in the present embodiment, as the priority, there is a standard priority and a temporary priority. The standard priority is the priority determined based on the frequency of inputting a word in the past, etc. The temporary priority is the priority obtained by adding a value for a word that is referred to by the user. The temporary priority has an expiration date and time. This is because a document, which is referred to while creating a certain document, is not always referred to when creating another document.

The extraction rule storage unit 125 stores a rule (hereinafter, "extraction rule") for extracting an addition target of the temporary priority from the reference words. The priority rule storage unit 126 stores information (hereinafter, "priority rule") indicating how to perform the addition of the temporary priority, according to the reading style. The reading generation rule storage unit 127 stores a rule (hereinafter, "reading generation rule") for generating the reading of a word (i.e., how a word is read) that is not stored in the candidate dictionary storage unit 128. The candidate dictionary storage unit 128 stores, for each word, the reading, the standard priority and the temporary priority for determining the display order at the time of predictive conversion, etc.

Meanwhile, the key input detecting unit 17 inputs the occurrence of a key input, in the conversion candidate display unit 18, when the key input (input of characters, etc.) by the user is detected (step S21). The conversion candidate display unit 18 identifies an input area based on the position where the key input has occurred on the screen D1, and stores the information indicating the input area, in the input area storage unit 129. Furthermore, the conversion candidate display unit 18 displays a list of conversion candidates based on a candidate dictionary stored in the candidate dictionary storage unit 128 (step S18), according to a key input to the input area.

Figure 5:
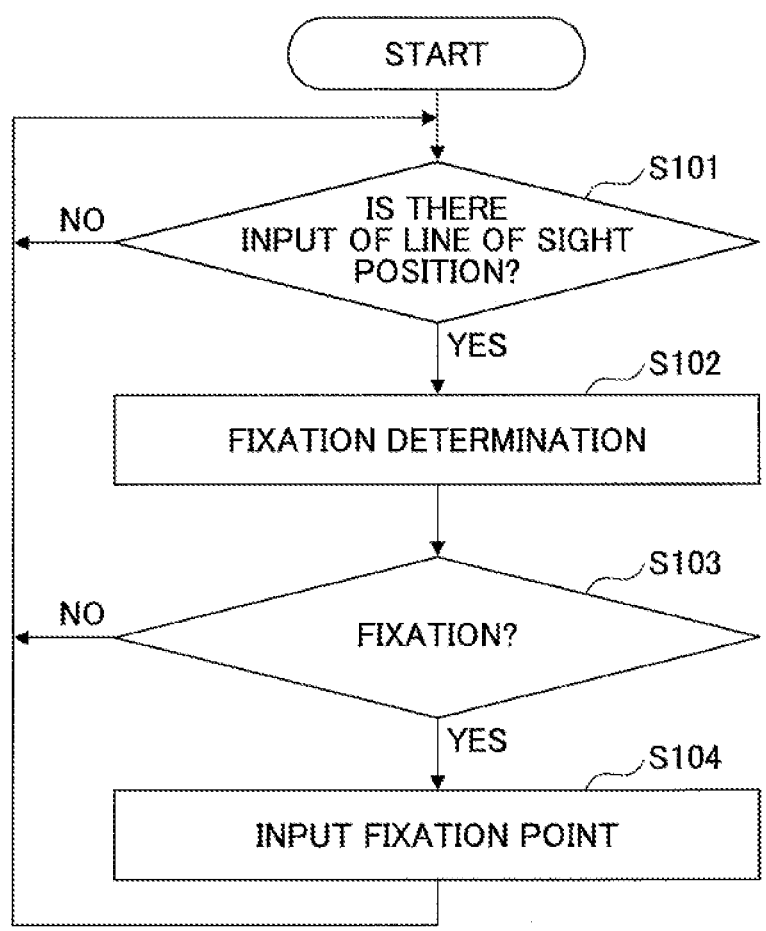
FIG. 5 is a flowchart of an example of processing procedures executed by a fixation determining unit according to the first embodiment.

In the following, a description is given of processing procedures executed by the units of the conversion device 10. FIG. 5 is a flowchart of an example of processing procedures executed by the fixation determining unit 12 according to the first embodiment.

When a line of sight position is input from the line of sight input unit 11 (YES in step S101), the fixation determining unit 12 executes a fixation determining process based on the history of line of sight positions that have been input up to this point, the times when the line of sight positions included in the history have been input, etc. (step S102). In the fixation determining process, the fixation determining unit 12 determines whether a fixation has occurred. Furthermore, when the fixation determining unit 12 determines that a fixation has occurred, the fixation determining unit 12 determines the position of the fixation point. Note that the fixation determining process may be performed by using a known technology. For example, a technology described in Japanese Laid-Open Patent Publication No. S61-214508 may be used.

When the fixation determining unit 12 determines that a fixation has occurred (YES in step S103), the fixation determining unit 12 inputs the position information of the fixation point in the reference word acquiring unit 13, the reference area identifying unit 14, and the reading style determining unit 15 (step S104). Note that the position coordinates of the fixation point are, for example, coordinate values in the coordinate system of the screen D1 (hereinafter, "screen coordinate system"). The screen coordinate system is a coordinate system in which, for example, the top left vertex of the screen D1 is (0, 0).

Figure 6:
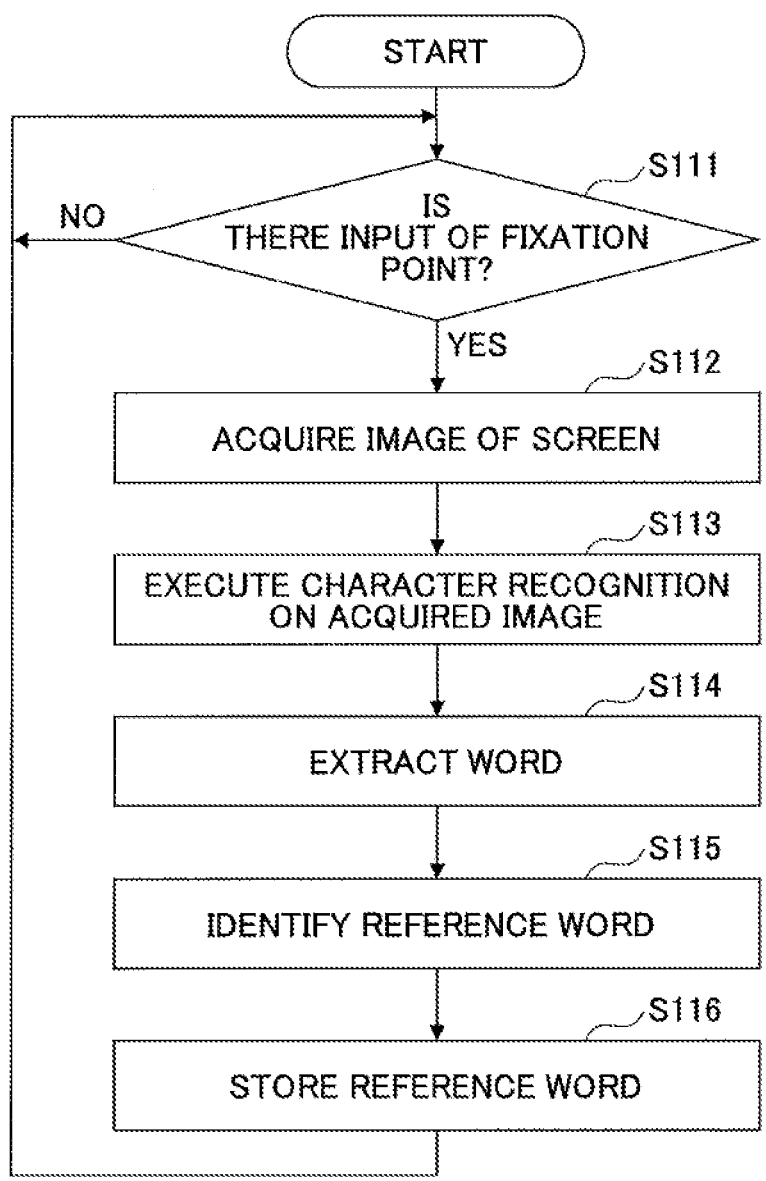
FIG. 6 is a flowchart of a first example of processing procedures executed by a reference word acquiring unit according to the first embodiment.

FIG. 6 is a flowchart of a first example of processing procedures executed by the reference word acquiring unit 13 according to the first embodiment.

When the position information of the fixation point is input (YES in step S111), the reference word acquiring unit 13 acquires an image of the screen D1 (step S112). For example, the image may be acquired by screen capturing. Next, the reference word acquiring unit 13 executes a character recognition process (OCR (Optical Character Recognition)) on the image (step S113). As a result, position information of a character string included in the image and the characters included in the character string are acquired. Next, the reference word, acquiring unit 13 extracts a word from the character string by, for example, morphological analysis, etc. (step S114). At this time, the rectangle coordinates of each word are calculated based on the position information of the characters constituting each word. The calculated rectangle coordinates are associated with each word. The rectangle coordinates are coordinate values indicating the position and the size of the circumscribed rectangle of the word; for example, the rectangle coordinates are coordinate values of the top left apex and the bottom right apex of the circumscribed rectangle. However, the position information of each character included in each word may be associated with the word. Note that when the coordinate system of the image does not match the screen coordinate system, the rectangle coordinates are converted into coordinate values in the screen coordinate system.

Next, the reference word acquiring unit 13 identifies a word near the fixation point as a reference word, based on the position information of the fixation point and the rectangle coordinates associated with each word (step S115). For example, a word included in a predetermined distance range from the fixation point is identified as the reference word. Therefore, a plurality of reference words may be identified with respect to a single fixation point. Note that the shape of the boundary of the predetermined distance range from the fixation point may be a circle, a rectangle, or other shapes. Next, the reference word acquiring unit 13 additionally stores the identified reference word in the reference word storage unit 121 (step S116).

FIG. 7 illustrates an example of a configuration of the reference word storage unit 121. As illustrated in FIG. 7, in the reference word storage unit 121, rectangle coordinates, a fixation point, a distance, a time and date, etc., are stored for each reference word. The rectangle coordinates are rectangle coordinates of the corresponding reference word. The fixation point is position information of the fixation point when the reference word is acquired. The distance is a distance between the fixation point and a rectangle area identified by the rectangle coordinates. For example, in the rectangle area, the linear distance between the fixation point and the nearest point to the fixation point or the furthest point from the fixation point, may be the value of the distance. Furthermore, the standard of determining a word near the fixation point in step S115 may be that the value of the distance is less than or equal to a predetermined value. Note that the value of the distance is based on the screen coordinate system. The time and date is the time and date when the reference coordinates are acquired.

Figure 8:
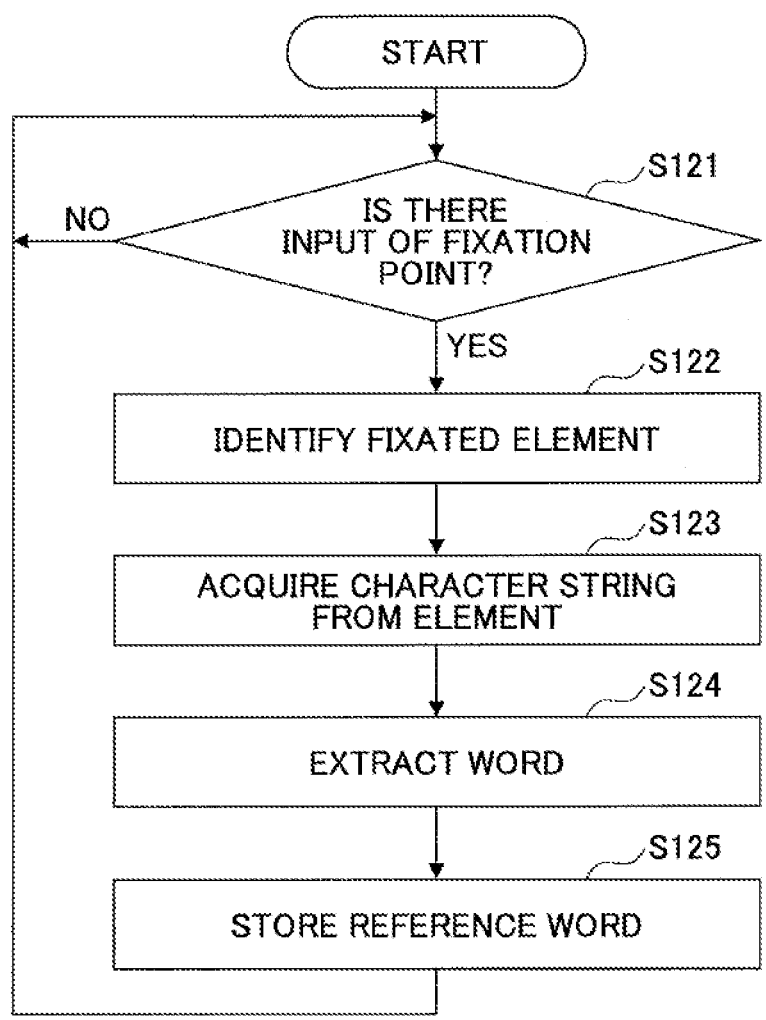
FIG. 8 is a flowchart of a second example of processing procedures executed by the reference word acquiring unit according to the first embodiment.

Note that when the document, which is displayed in a window including the fixation point, is a HTML (HyperText Markup Language) document, a reference word may be acquired by the process illustrated in FIG. 8.

FIG. 8 is a flowchart of a second example of processing procedures executed by the reference word acquiring unit 13 according to the first embodiment.

When the position information of the fixation point is input (YES in step S121), the reference word acquiring unit 13 identifies the fixated HTML element among the HTML elements, based on the position information (step S122). For example, a document.elementFromPoint( ) function, which is an API (Application Program Interface) of the Web browser, may be used to acquire the HTML element from the position information of the fixation point. Note that a HTML element is an element between a start tag and an end tag. Next, the reference word acquiring unit 13 acquires a character string included in the identified HTML element (step S123). Next, the reference word acquiring unit 13 extracts words from the character string by, for example, morphological analysis, etc. (step S124). Next, the reference word acquiring unit 13 stores the extracted words as reference words, in the reference word storage unit 121 (step S125). Note that at this time, the rectangle coordinates do not have to be stored.

FIG. 9 is a flowchart of an example of processing procedures executed by the reference area identifying unit 14 according to the first embodiment.

When the position information of the fixation point is input (YES in step S131), the reference area identifying unit 14 identifies a window including the fixation point as a fixation area (step S132). The reference area identifying unit 14 stores the identification information of the identified window in association with the present time and date, in the fixation area storage unit 122.

FIG. 10 illustrates an example of a configuration of the fixation area storage unit 122. In FIG. 10, each record of the fixation area storage unit 122 includes items of the time and date, the fixation area, etc. The time and date is the time and date when the record is recorded. The fixation area is identification information of the window identified as the fixation area. FIG. 10 illustrates an example in which a window handle is used as the identification information. However, the coordinate values of the top left apex and the top right apex of the window in the screen coordinate system, etc., may be used as the identification information.

Next, the reference area identifying unit 14 determines whether the identified window (hereinafter, "fixation area") is different from the window that is identified as the input area (step S133). The window that is identified as the input area may be identified by referring to the input area storage unit 129. That is, the input area storage unit 129 stores identification information of the window identified as the input area. When a plurality of windows are identified as input areas, the identification information of a plurality of windows may be stored in the input area storage unit 129. Note that the input area is identified by the conversion candidate display unit 18 according to a key input. Therefore, if a key input is not performed until the time point when step S133 is executed, there is a possibility that the identification information of the input area is not stored in the input area storage unit 129. When the identification information of the input area is not stored in the input area storage unit 129, step S134 and onward are not executed, and the process is to return to step S131. In this case, a reference area is not identified. Furthermore, also when identification information of the input area is stored in the input area storage unit 129, and the identification information of the fixation area matches the identification information of the input area (NO in step S133), the process returns to step S131.

On the other hand, when the identification information of the fixation area is different from the identification information of the input area (YES in step S133), the reference area identifying unit 14 additionally stores the information relevant to the fixation area in the reference area storage unit 123 (step S134). Note that the configuration of the reference area storage unit 123 may be the same as the configuration of the fixation area storage unit 122. Furthermore, the information relevant to the fixation area means the content of the record stored in the fixation area storage unit 122 with respect to the fixation area.

Figure 11:
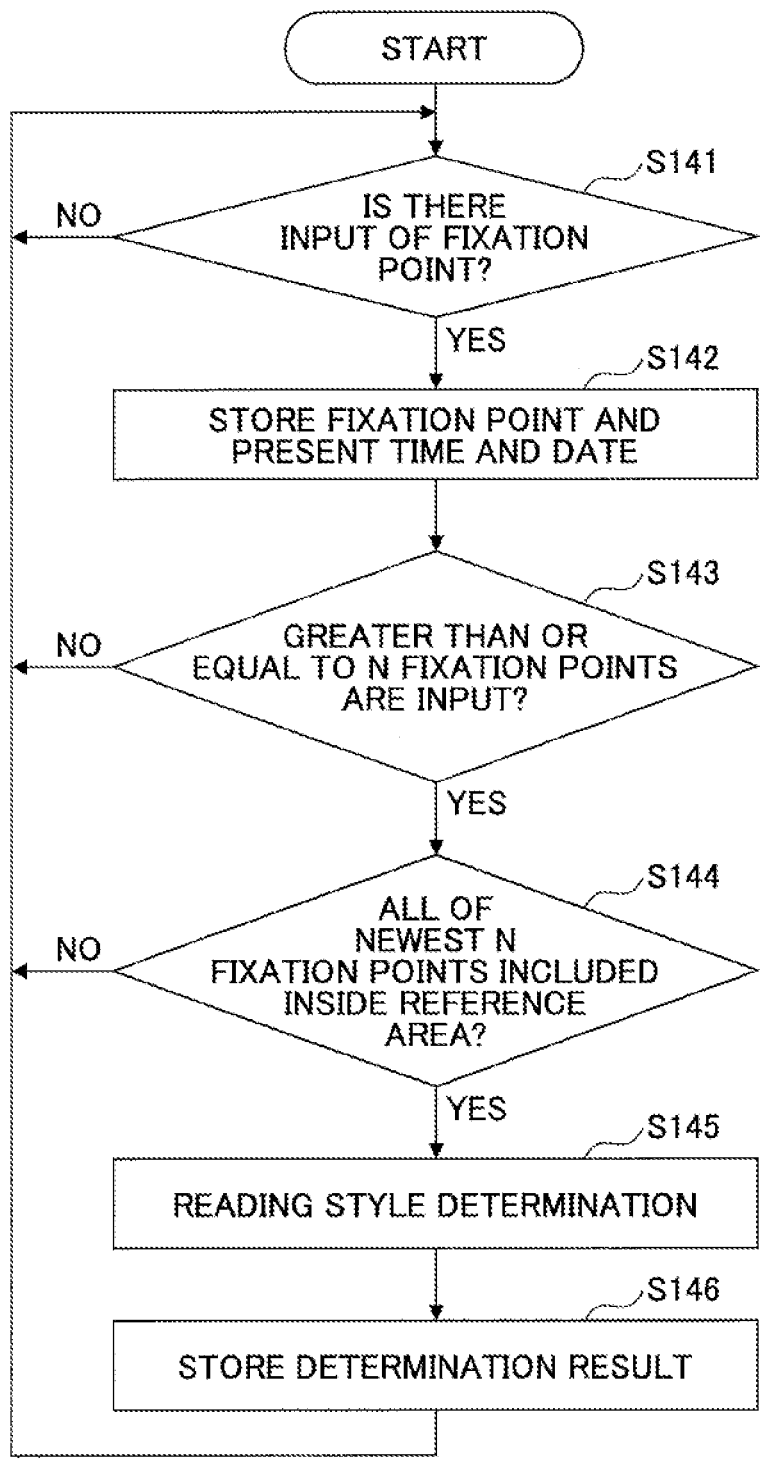
FIG. 11 is a flowchart of an example of processing procedures executed by a reading style determining unit according to the first embodiment.

FIG. 11 is a flowchart of an example of processing procedures executed by the reading style determining unit 15 according to the first embodiment.

When the position information of the fixation point is input (YES in step S141), the reading style determining unit 15 stores the position information in association with the present time and date, in the memory device 103 (step S142). Next, the reading style determining unit 15 determines whether an N number of fixation points or more have been input up to now (step S143). That is, the reading style determining unit 15 determines whether input of a fixation point has occurred an N number of times or more. This determination may be made by referring to the memory device 103. N is the number of fixation points needed for the process of determining the reading style in step S144. When an N number of fixation points or more have been input up to now (YES in step S143), the reading style determining unit 15 determines whether all of the newest N number of fixation points are included in the reference area (step S144). That is, it is determined whether the positions indicated by the position information of the newest N number of fixation points stored in the memory device 103, are included in the range, of the reference area. The range of the reference area may be identified by obtaining the range of the window relevant to the window handle stored in the reference area storage unit 123.

When ail of the newest N number of fixation points are included in the reference area (YES in step S144), the reading style determining unit 15 executes a process of determining the reading style (step S145). The determination process may be executed by using a technology described in, for example, Japanese Laid-open Patent Publication No. H11-85452. Note that the process of determining the reading style is executed when all of the newest N number of fixation points are included in the reference area, and therefore, in step S145, the reading style with respect to the reference area is determined. Next, the reading style determining unit 15 stores the determination result of the reading style in the reading style storage unit 124 (step S146).

FIG. 12 illustrates an example of a configuration of the reading style storage unit 124. In FIG. 12, the reading style storage unit 124 stores a time and date and a reading style for each determination result of a reading style. The time and date is the time and date when the determination is made. The reading style is the reading style indicated by the determination result.

Figure 13:
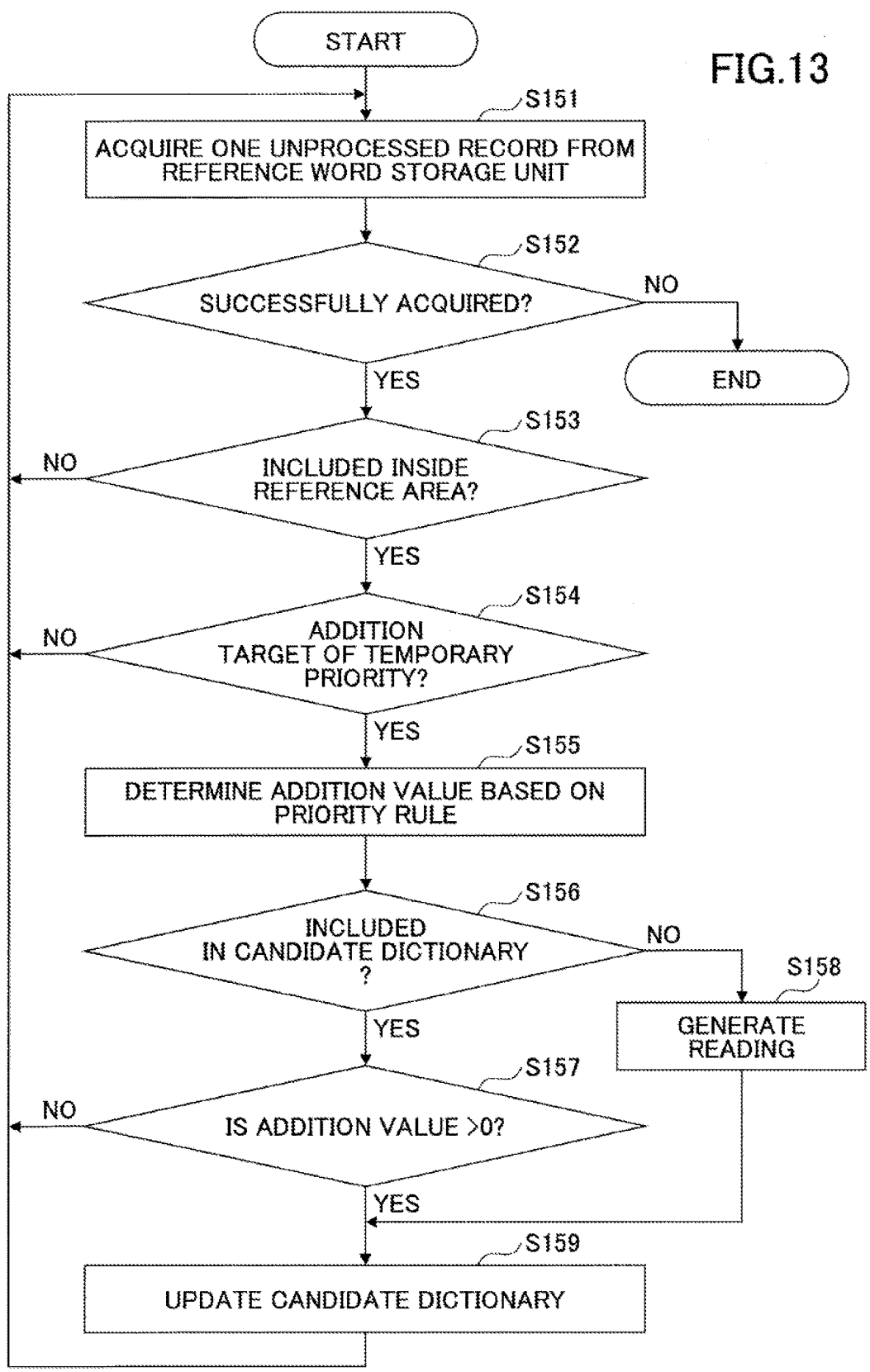
FIG. 13 is a flowchart of an example of processing procedures executed by a candidate dictionary update unit according to the first embodiment.

FIG. 13 is a flowchart of an example of processing procedures executed by the candidate dictionary update unit 16 according to the first embodiment. Note that the process of FIG. 13 may be executed, for example, every time a new reference word is added to the reference word storage unit 121, or at every predetermined time interval. Furthermore, when a window handle is not stored in the reference area storage unit 123 (that is, a reference area is not yet identified) when the timing to start the process of FIG. 13 approaches, the process of FIG. 13 does not have to be started.

In step S151, the candidate dictionary update unit 16 acquires one unprocessed record from the reference word storage unit 121 (FIG. 7). An unprocessed record is a record that is not set as a processing target with respect to FIG. 13. When an unprocessed record is acquired, that is, when there is an unprocessed record (YES in step S152), the candidate dictionary update unit 16 determines whether the range identified by the rectangle coordinates of the record is included inside the reference area (step S153). That is, the candidate dictionary update unit 16 determines whether the reference word relevant to the record (hereinafter, "target word") is included inside the reference area. The range of the reference area may be identified by obtaining the area of the window relevant to the window handle stored in the reference area storage unit 123. Note that when a plurality of reference areas are identified, the candidate dictionary update unit 16 determines whether the target word is included inside the range of any one of the reference areas.

When the target word is not included inside the reference area (NO in step S153), the process returns to step S151. When the target word is included inside the reference area (YES in step S153), the candidate dictionary update unit 16 determines whether the target word is an addition target of the temporary priority in the candidate dictionary storage unit 128, by referring to the extraction rule stored in the extraction rule storage unit 125 (step S154).

FIG. 14 illustrates an example of extraction rules according to the first embodiment. In FIG. 14, each line corresponds to an extraction rule. Each extraction rule includes a condition and an action. The condition is the condition with respect to the reference word. The action is information indicating whether the reference word matching the condition is to be set as an addition target of the temporary priority. In FIG. 14, the first extraction rule is that a reference word whose distance from the fixation point is less than or equal to α, is to be set as the addition target of the temporary priority. Furthermore, the second extraction rule indicates that particles and symbols are not to be set as the addition target of the temporary priority. Mote that the extraction rules may be set as needed according to operations.

Therefore, in step S154, when the target word is not a particle or a symbol, and the distance stored in the reference word, storage unit 121 with respect to the target word is less than or equal to α, the target word is determined to be an addition target of the temporary priority. Note that the extraction rule may be used in FIGS. 6 and 8. That is, only the reference words to be set as addition targets of the temporary priority, may be stored in the reference word storage unit 121. In this case, the determination of step S154 does not have to be executed.

When the target word is an addition target of the temporary priority (YES in step S154), the candidate dictionary update unit 16 refers to the priority rule stored in the priority rule storage unit 126, and determines the addition value (step S155).

FIG. 15 illustrates an example of priority rules according to the first embodiment. In FIG. 15, each line corresponds to a priority rule. Each priority rule includes a condition and an action. The condition is the condition for distinguishing the mode of the addition of the temporary priority. The action is information indicating the mode of the addition of the temporary priority. In FIG. 15, the first priority rule indicates that 100 is added to the temporary priority with respect to all reference words, when the reading style is read thoroughly. Furthermore, the second priority rule indicates that 100 is added to the temporary priority only with respect to the reference word fixated at last, when the reading style is skim through.

Note that the priority rules of FIG. 15 are based on the following concept. When the user is thoroughly reading the reference area, it is considered that the reference words are uniformly important for the user. Therefore, a uniform value is added to the priority with respect to all of the reference words. On the other hand, when the user is skimming through the reference area, it is assumed that the user is searching for a certain word. In this case, the word that the user has fixated at last is highly likely to be the certain word. That is, it is assumed that the user has stopped skimming through the reference area because the word he has been looking for is found. In this case, the reference word that the user has fixated at last is more likely to be input, than the other reference words. Therefore, in this case, a value is added to the temporary priority only with respect to the reference word fixated at last.

Therefore, in step S155, first, the reading style is determined. The reading style is determined based on the last record in the reading style storage unit 124. When the value of the reading style in the last record is "read thoroughly", it is determined that the addition value of the temporary priority is 100. On the other hand, when the value of the reading style in the last record is "skim through", the candidate dictionary update unit 16 determines whether the target word is the reference word that has been fixated at last. The candidate dictionary update unit 16 determines whether the target word is the reference word that has been fixated at last, by referring to the reference word storage unit 121. That is, if the target word is the reference word in the last record in the reference word storage unit 121, the target word is determined to be the reference word that has been fixated at last. Therefore, in this case, the candidate dictionary update unit 16 determines that the addition value of the temporary priority is 100. Note that when the target word does not match any of the conditions of the priority rules, the candidate dictionary update unit 16 determines that the addition value of the temporary priority is zero.

Note that the reference value that has been fixated at last may be identified by, for example, a technology described in Japanese Laid-Open Patent Publication No. H10-91378, instead of by the reference word storage unit 121. Furthermore, the priority rules may be set as needed according to operations.

Next, the candidate dictionary update unit 16 determines whether the target word is stored in the candidate dictionary storage unit 128 (step S156).

FIG. 16 illustrates an example of the candidate dictionary storage unit 128. In FIG. 16, each record of the candidate dictionary storage unit 128 includes a word, the reading, a standard priority, a temporary priority, a temporary priority update time and date, etc. The word is a word that is a conversion candidate at the time of predictive conversion. The reading is the reading of the word. The standard priority is the standard priority applied to the word. The temporary priority is the temporary priority applied to the word. The temporary priority update time and date is the time and that the temporary priority has been updated last.

In step S156, the candidate dictionary update unit 16 determines whether a record including the target word as the word is stored in the candidate dictionary storage unit 128. When the target word is stored in the candidate dictionary storage unit 128 (YES in step S156), and the addition value determined in step S155 is greater than zero (YES in step S157), the candidate dictionary update unit 16 updates the temporary priority in the record relevant to the target word in the candidate dictionary storage unit 128 (step S159). That is, an addition value is added to the temporary priority in the record. Furthermore, the temporary priority update time and date in the record is updated to the present time and date. As a result, the priority of the word of the record becomes higher than the case where the word is not included among the reference words.

On the other hand, when the target word is not stored in the candidate dictionary storage unit 128 (NO in step S156), the candidate dictionary update unit 16 generates the reading of the target word based on the reading generation rule stored in the reading generation rule storage unit 127 (step S158).

FIG. 17 illustrates an example of the reading generation rule. In FIG. 17, each line corresponds to a reading generation rule. Each reading generation rule includes a condition and a reading generation method. The condition is the condition with respect to a reference word. The reading generation rule is the method of generating the reading of a reference word matching the condition. In FIG. 17, the first reading generation rule is for generating the reading of a URL (Uniform Resource Locator) starting with "http://", and the entire URL and the character string excluding "http://" are generated as the reading. Therefore, in this case, the reading is generated such that when "h" is input, or when characters following "http://" are input, the corresponding URL is indicated as a conversion candidate.

The second reading generation rule is for generating the reading of a 10 digit telephone number, and the 10 digit telephone number and the number string other than the area code are generated as the reading. Therefore, in this case, the reading is generated such that when the first number of the area code of the telephone number is input, or when the number immediately after the area code is input, the telephone number is indicated as a conversion candidate. Note that, it may be strictly determined as to whether a 10 digit number is a telephone number, or the reading may be generated for the 10 digit number without strictly determining whether the 10 digit number is a telephone number.

The third reading generation rule is that a ruby is generated as the reading with respect to a word having a ruby appended.

As described above, the reading generation rule according to the present embodiment indicates a method of generating the reading with respect to a character string that is not included in a general-purpose dictionary, such as a URL, a telephone number, etc. This means that in step S114 of FIG. 6 and in step S124 of FIG. 8, a URL, a telephone number, etc., are also extracted as words. Mote that a reading generation rule may be set for other information such as a mail address, etc.

Next, the candidate dictionary update unit 16 adds a record relevant to the target word, in the candidate dictionary storage unit 128 (step S159). At this time, as the reading in the record, the reading generated in step S158 is stored. Furthermore, the standard priority of the record is set to be zero. The temporary priority of the record is the addition value determined in step S155. The temporary priority update time and date of the record is the present time and date.

The process of FIG. 13 is executed for each unprocessed reference word stored in the reference word storage unit 121. When processing of all reference words is completed (NO in step S152), the process of FIG. 13 ends.

Note that there may be an embodiment of not determining the addition value of the temporary priority based on the reading style. In this case, a uniform addition value may be defined for all reference words, regardless of the reading style. Furthermore, the process of determining the reading style (FIG. 11) does not have to be executed.

Furthermore, each reference word may be converted into a different language from the language of the reference word, and the process of FIG. 13 may be executed for the reference word and for the word after the conversion. For example, when the reference word is in Japanese, the reference word may be translated into English, and the process of FIG. 13 may be executed for the reference word in Japanese and the word in English.

Figure 18:
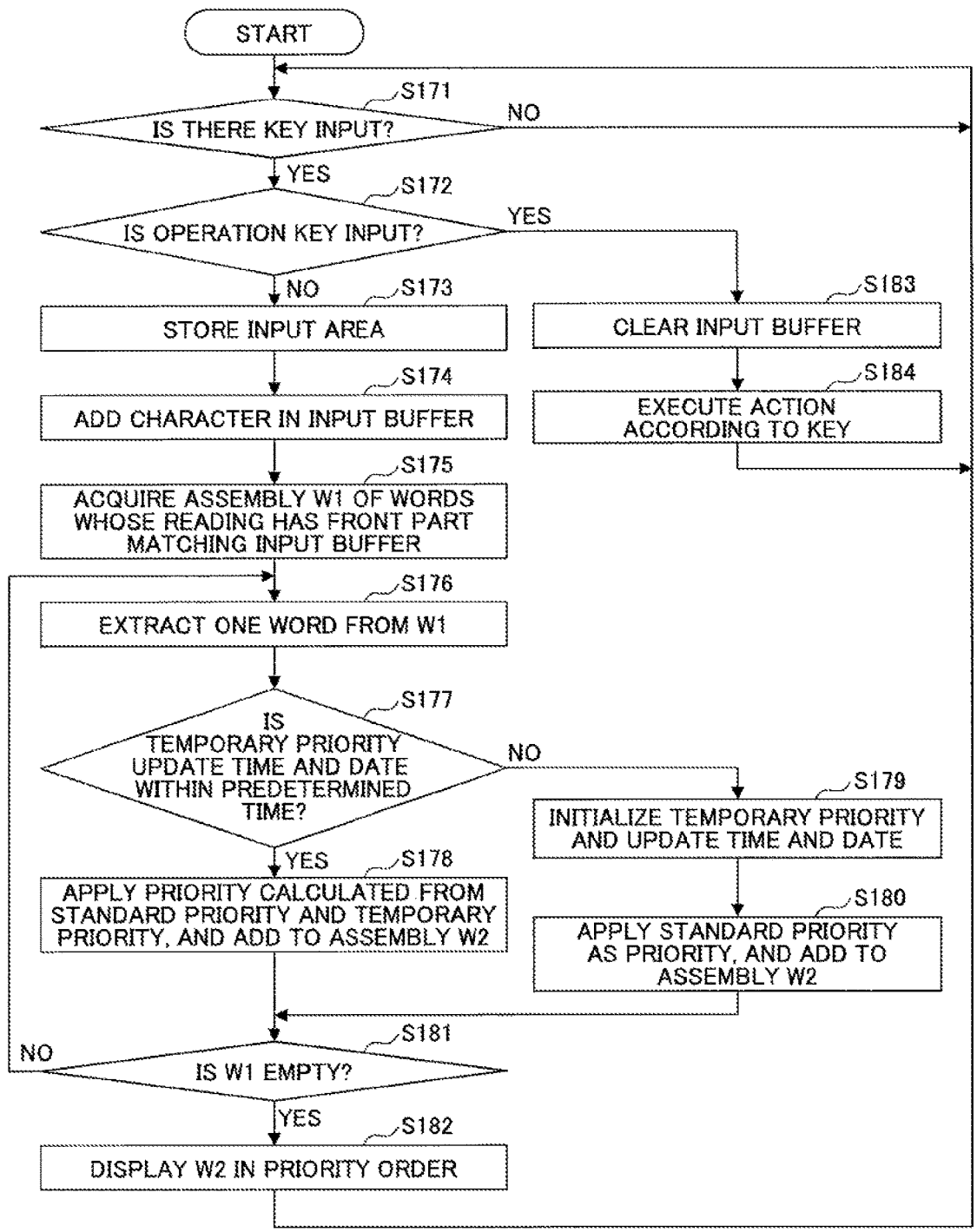
FIG. 18 is a flowchart of an example of processing procedures executed by a conversion candidate display unit according to the first embodiment.

FIG. 18 is a flowchart of an example of processing procedures executed by the conversion candidate display unit 18 according to the first embodiment.

When the occurrence of a key input is reported from the key input detecting unit 17 (step S171), the conversion candidate display unit 18 refers to the operation key storage unit 130 and determines whether the key that is the input target (hereinafter, "input key") is an operation key (step S172). An operation key is a key used for purposes other than inputting characters, such as an Enter key, an Esc key, etc., which is used for operations of the predictive conversion.

FIG. 19 illustrates an example of a configuration of the operation key storage unit 130. In FIG. 19, the operation key storage unit 130 stores a key code and an action for each operation key. FIG. 19 indicates that an Enter key and an Escape key are operation keys. The action of the Enter key is to confirm the conversion object, and the action of the Escape key is to cancel the conversion.

When the input key is not an operation key (NO in step S172), the conversion candidate display unit 18 stores the window handle of the window that is the target of the key input, in the input area storage unit 129 (step S173). Note that when a plurality of windows are input targets among the windows presently displayed, window handles of a plurality of windows may be stored in the input area storage unit 129. That is, the input area is not limited to a single window.

Next, the conversion candidate display unit 18 adds a character corresponding to the input key to the input buffer (step S174). An input buffer is a buffer for storing the input character string, until the predictive conversion is performed, and the input buffer is generated in, for example, the memory device 103. Next, the conversion candidate display unit 18 acquires an assembly of words whose reading has a front part that matches the character string stored in the input buffer, from among the words stored in the candidate dictionary storage unit 128 (step S175). In the following, this assembly is referred to as an "assembly W1".

Next, the conversion candidate display unit 18 acquires one word from the assembly W1 (step S176). The acquired word (hereinafter, "target word") is deleted from the assembly W1. Next, the conversion candidate display unit 18 determines whether the temporary priority update time and date stored in the candidate dictionary storage unit 128 with respect to the target word, is within a predetermined time from the present time and date (step S177). This is to limit the expiration date and time of the temporary priority within a predetermined time. The predetermined time may be, for example, several minutes, etc.

When the temporary priority update time and date is within a predetermined time (YES in step S177), the conversion candidate display unit 18 sets the sum of the standard priority and the temporary priority stored in the candidate dictionary storage unit 128 with respect to the target word, as the priority of the target word (step S178).

The conversion candidate display unit 18 adds the target word in an assembly W2 in association with the obtained priority. Note that the initial state of the assembly W2 is empty.

On the other hand, when the temporary priority update time and date is not within a predetermined time (NO in step S177), the conversion candidate display unit 18 initializes the temporary priority and the temporary priority update time and date stored in the candidate dictionary storage unit 128 with respect to the target word (step S179). That is, the temporary priority is updated to be zero. Furthermore, the temporary priority update time and date are deleted. Next, the conversion candidate display unit 18 sets the standard priority stored in the candidate dictionary storage unit 128 with respect to the target word, as the priority of the target word (step S180). The conversion candidate display unit 18 adds the target word to the assembly W2, in association with the priority.

Note that when a temporary priority update time and date are not stored with respect to the target word, the determination of step S177 may be YES or NO. This is because, in this case, no matter what the determination is, the standard priority of the target word is set as the priority.

When processing for all words in the assembly W1 is completed (YES in step S181), the conversion candidate display unit 18 displays the group of words included in the assembly W2 as conversion candidates of predictive conversion (step S182). At this time, the words are displayed in an order based on the priority. That is, the word is displayed at a higher rank as the priority becomes higher, and the word is displayed at a lower rank as the priority becomes lower.

Furthermore, when the input key is an operation key (YES in step S172), the conversion candidate display unit 18 makes the input buffer empty (step S183). Next, the conversion candidate display unit 18 executes the action stored in the operation key storage unit 130 in association with the operation key (step S184). For example, in a state where a list of conversion candidates is displayed, when the Enter key is input, the conversion candidate that is being selected in the list is input to the input area. Furthermore, in a state where a list of conversion candidates is displayed, when an Escape key is input, the list of conversion candidates is hidden.

Note that when the user continuously inputs characters, the process of FIG. 18 is executed every time a character is input. Therefore, as the number of characters stored in the input buffer increases, the conversion candidates are narrowed down.

As described above, according to the first embodiment, with respect to a word included in an area that the user is referring to, the priority is increased. Therefore, when a user is referring to a certain document and is creating another document, it is possible to increase the likelihood that the word included in the certain document is displayed at a high ranking as a conversion candidate. As a result, the efficiency of the operation of inputting character strings is increased.

Note that in the first embodiment, the reference area does not have to be in units of windows; the reference area may be a part of a window.

Figure 20:
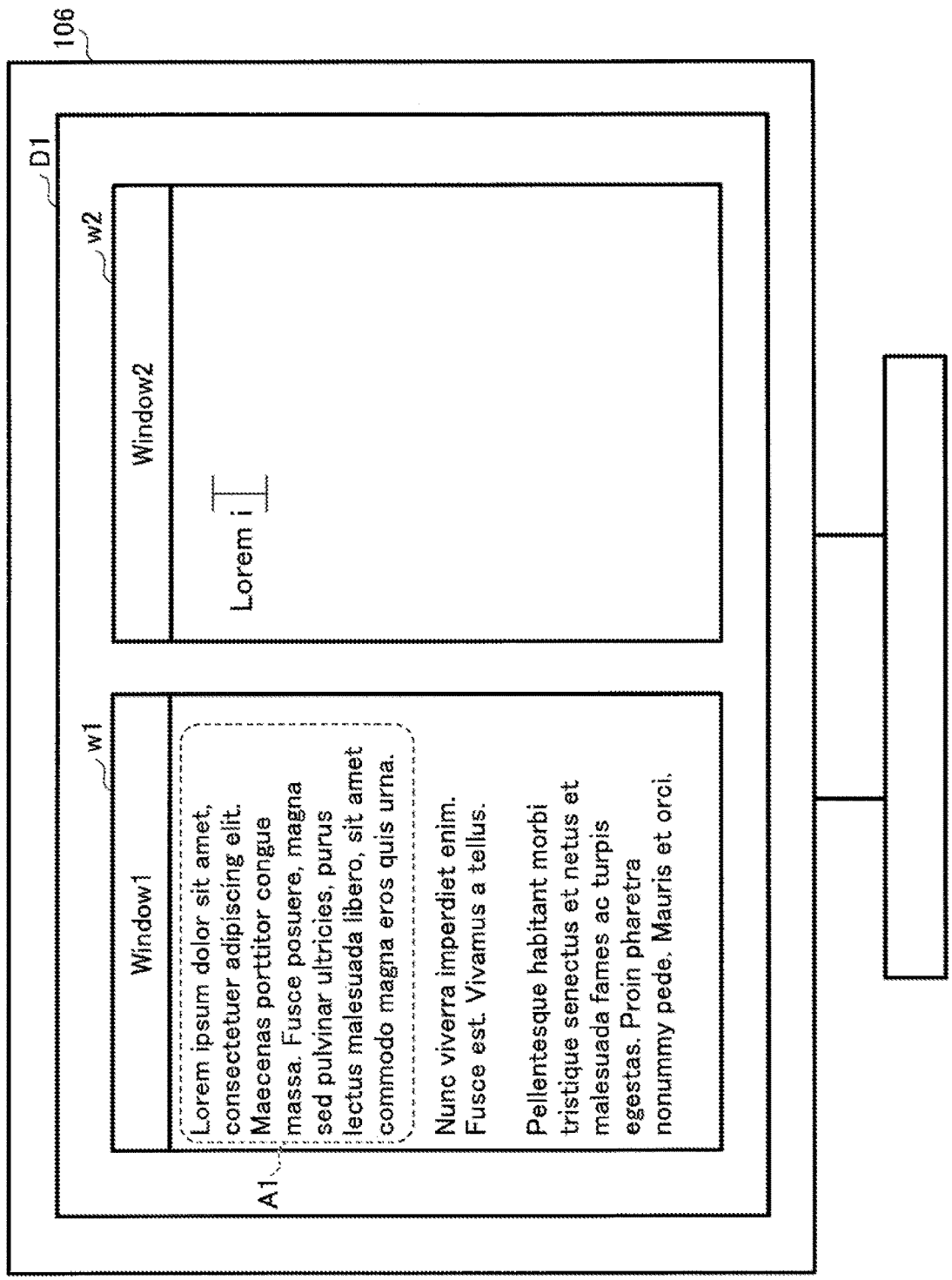
FIG. 20 illustrates a second example of an input area and a reference area according to the first embodiment.

FIG. 20 illustrates a second example of an input area and a reference area according to the first embodiment. In FIG. 20, the same elements as those of FIG. 4 are denoted by the same reference numerals.

FIG. 20 illustrates an example where an area A1, which is part of the window w1, is the reference area. In this case, in step S132 of FIG. 9, a predetermined range from the fixation point is to be identified as the fixation area. Furthermore, the reference area storage unit 123 may store rectangle coordinates of the predetermined range, as information indicating the reference area. The predetermined range may be identified based on the structure of the text, such as a paragraph including the fixation point, or the predetermined range may be identified in units of division areas formed by dividing the window w1 into a predetermined number of areas.

Next, a description is given of a second embodiment. In the second embodiment, the points that are different from the first embodiment are described. The points that are not particularly mentioned in the second embodiment may be the same as the first embodiment. In the second embodiment, an example in which the reference area and the input area are mixed in a single window is described.

Figure 21:
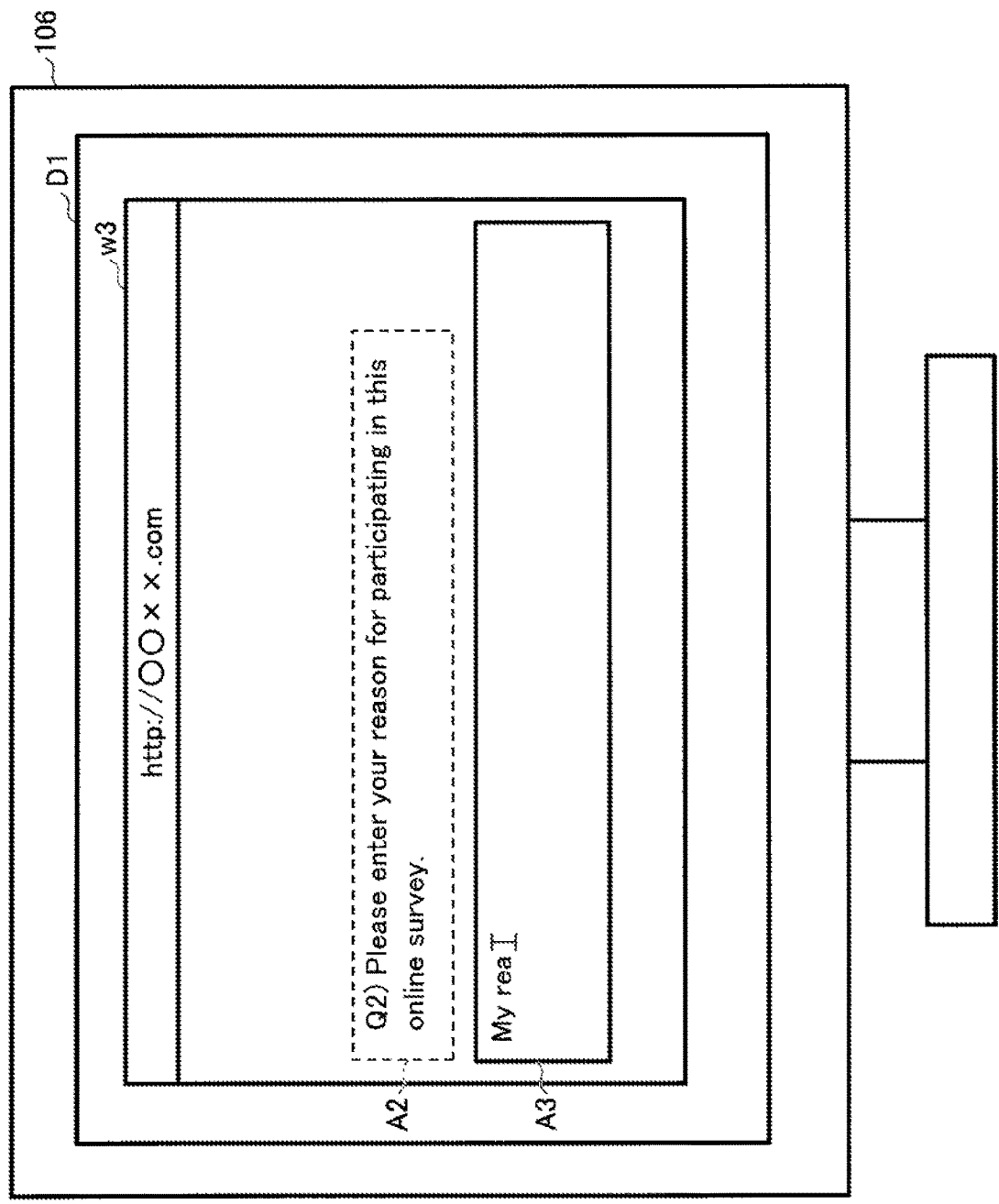
FIG. 21 illustrates an example of an input area and a reference area according to a second embodiment.

FIG. 21 illustrates an example of an input area and a reference area according to the second embodiment. In FIG. 21, the same elements as those of FIG. 4 are denoted by the same reference numerals, and descriptions thereof are omitted. FIG. 21 illustrates an example where a reference area A2 and an input area A3 are included in a window w3.

The input area A3 is, for example, an edit box in an input form displayed in the window w3. The reference area A2 is, for example, an area including descriptive text in the input form.

Figure 22:
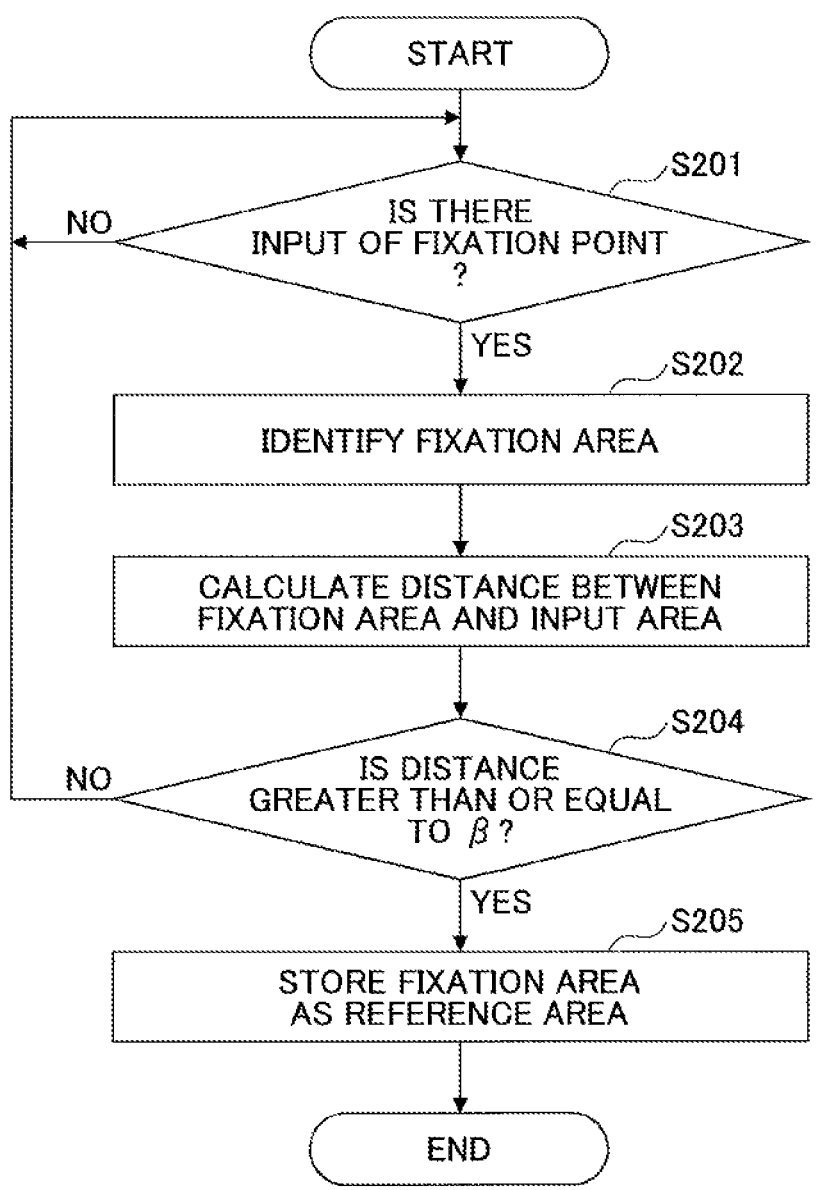
FIG. 22 is a flowchart of an example of processing procedures executed by the reference area identifying unit according to the second embodiment.

In the second embodiment, the processing procedures of FIG. 9 are replaced by those of FIG. 22. FIG. 22 is a flowchart of an example of processing procedures executed by the reference area identifying unit 14 according to the second embodiment.

When the position information of the fixation point is input (YES in step S201), the reference area identifying unit 14 identifies a predetermined area including the fixation point, as the fixation area (step S202). The reference area identifying unit 14 stores the identification information of the identified fixation area in association with the present time and date, in the fixation area storage unit 122 (FIG. 10). Note that the predetermined area may be the same as that described with reference to FIG. 21. Furthermore, in the second embodiment, the identification information of the identified fixation area is, for example, rectangle coordinates of the fixation area.

Next, the reference area identifying unit 14 calculates the distance between the fixation area identified in step S202, and the input area (step S203). The input area may be identified by referring to the input area storage unit 129. In the second embodiment, for example, the input area storage unit 129 stores the rectangle coordinates of the input area. The distance between the fixation area and the input area may be, for example, the shortest distance or the longest distance between the two areas. Alternatively, when the fixation area and the input area are arranged next to each other in the perpendicular direction, the distance may be between the base side of the area on the upper side and the top side of the area on the lower side. The value of the distance is based on the screen coordinate system.

Note that assuming that a key input is not performed up to the time point when step S203 is executed, there is a possibility that rectangle coordinates of the input area are not stored in the input area storage unit 129. When rectangle coordinates of the input area are not stored in the input area storage unit 129, step S203 and onward are not executed, and the process is to return to step S201.

Next, the reference area identifying unit 14 determines whether the distance between the fixation area and the input area is greater than or equal to a threshold $\beta$ (step S204). The purpose of this determination is to confirm that the fixation area and the input area are not substantially the same area. When the distance is less than the threshold $\beta$ (NO in step S204), the process returns to step S201. When the distance is greater than or equal to the threshold $\beta$ (YES in step S204), the reference area identifying unit 14 additionally stores the information relevant to the fixation area, in the reference area storage unit 123 (step S205).

Furthermore, in the second embodiment, in step S173 of FIG. 18, the conversion candidate display unit 18 stores, for example, the rectangle coordinates of the display element (an edit box, etc.) that is the target of the key input, in the input area storage unit 129.

As described above, in the second embodiment, even when the reference area and the input area are included in the same window, it is possible to increase the likelihood that the word being referred to by the user is displayed at a high ranking in the display order of conversion candidates. Note that the second embodiment is also effective in a status where the reference area and the input area are in different windows.

Next, a description is given of a third embodiment. In the third embodiment, the points that are different from the first and second embodiments are described. The points that are not particularly mentioned in the third embodiment may be the same as the first and second embodiments.

Figure 23:
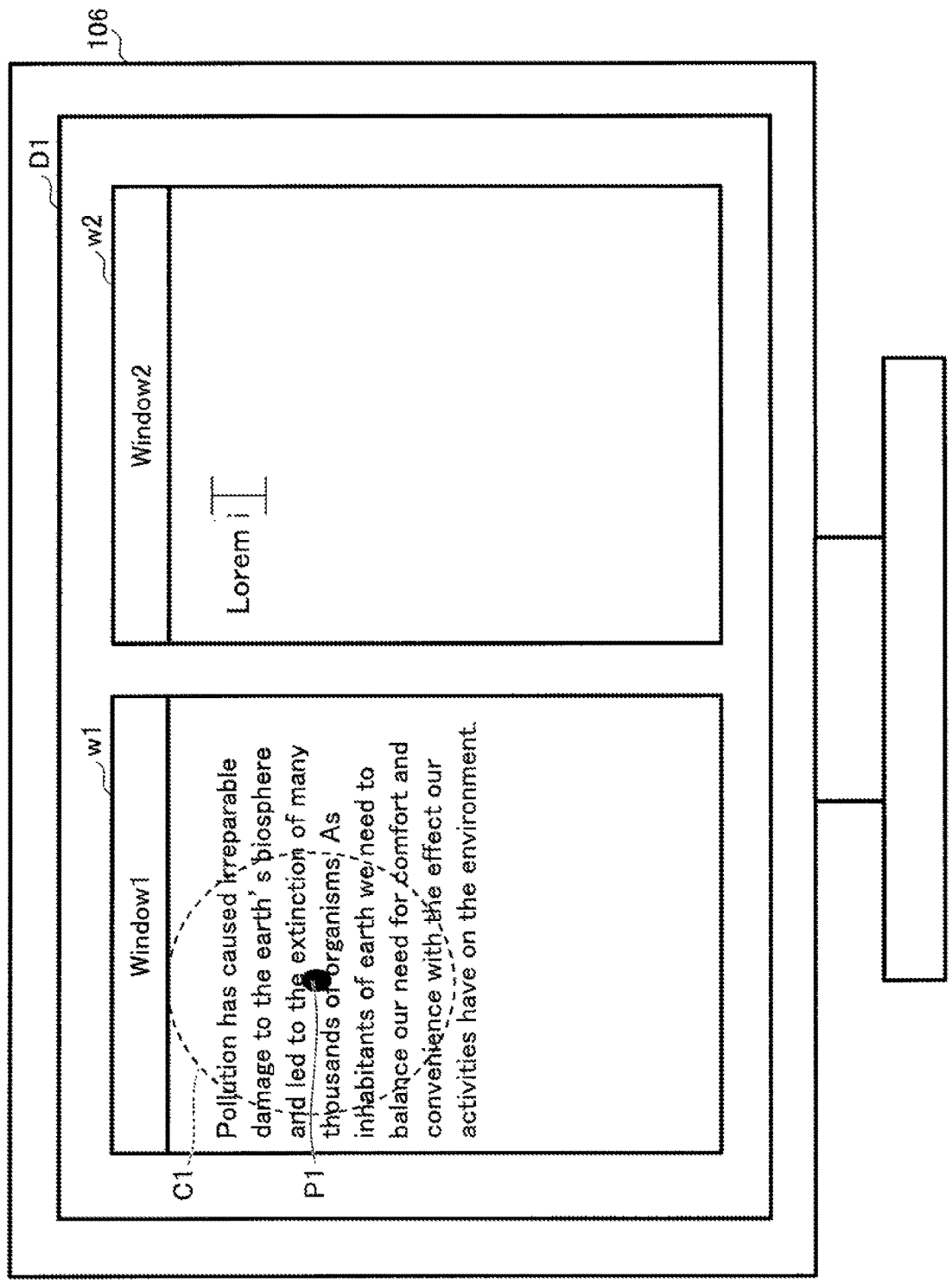
FIG. 23 illustrates an example of an input area and a reference area according to a third embodiment.

FIG. 23 illustrates an example of an input area and a reference area according to the third embodiment. In FIG. 23, the same elements as those of FIG. 4 are denoted by the same reference numerals, and descriptions thereof are omitted.

In FIG. 23, a circle C1 is a circle having a fixation point P1 as the center, and a radius of a predetermined value. In the third embodiment, the circle C1 is the reference area. Meanwhile, the window w2 is the input area. Note that, as described in the second embodiment, a state where the reference area and the input area are included in the same window is also applicable.

In the third embodiment, the processing procedures executed by the reference area identifying unit 14 are different from the above embodiments. That is, the processes of FIG. 9 or FIG. 22 are replaced by FIGS. 24 and 25.

Figure 24:
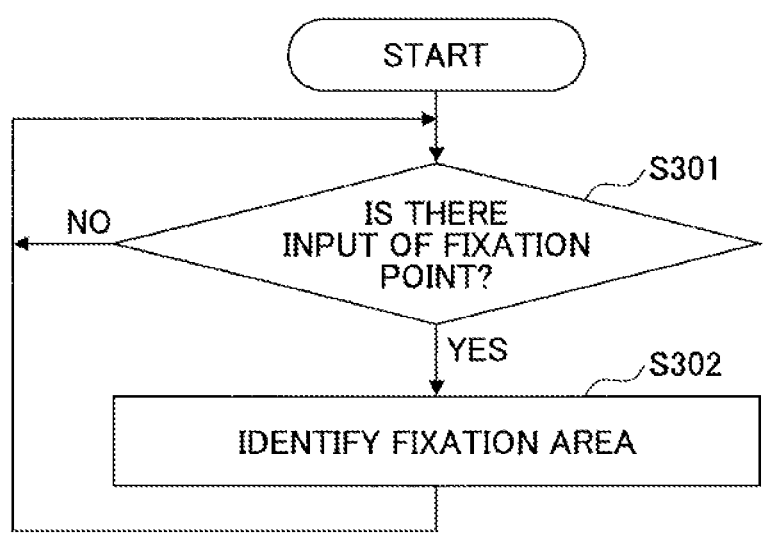
FIG. 24 is a flowchart of an example of processing procedures executed by a reference area identifying unit in response to input of a fixation point, according to the third embodiment.

FIG. 24 is a flowchart of an example of processing procedures executed by the reference area identifying unit 14 in response to input of a fixation point, according to the third embodiment.

When the position information of the fixation point is input (YES in step S301), the reference area identifying unit 14 identifies range of a circle having the fixation point and the center and the radius of a predetermined value, as the fixation area (step S302). The reference area identifying unit 14 stores the identification information of the identified fixation area in the fixation area storage unit 122 (FIG. 10) in association with the present time and date. Note that in the third embodiment, the identification information of the fixation area is, for example, the position information of the fixation point and the radius. However, when the radius is fixed, the radius does not have to be included in the identification information of the fixation area.

Figure 25:
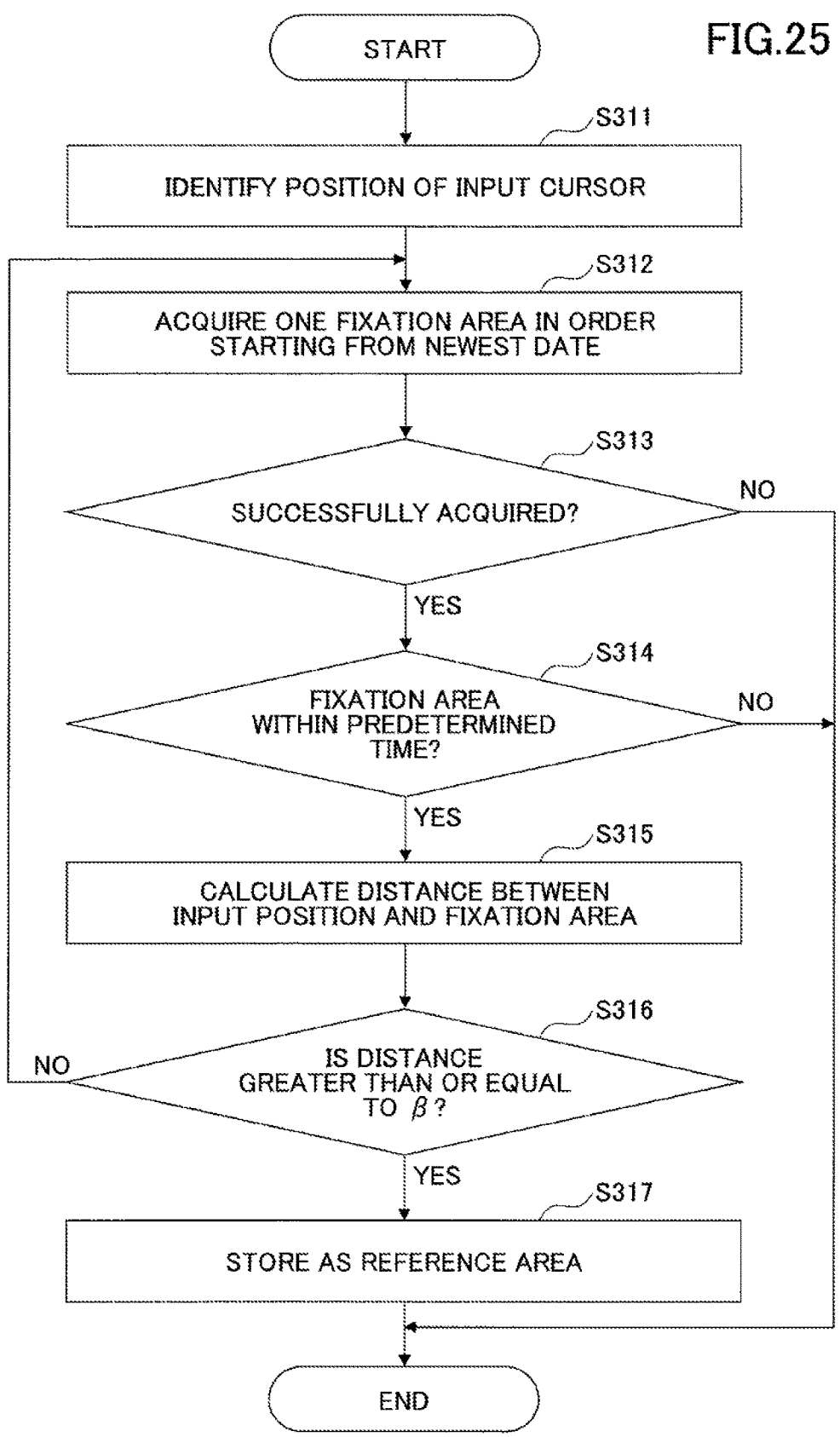
FIG. 25 is a flowchart of an example of processing procedures of a process of identifying a reference area according to the third embodiment.

Furthermore, in the third embodiment, the reference area identifying unit 14 executes the process illustrated in FIG. 25 in order to identify the reference area from the fixation area.

FIG. 25 is a flowchart of an example of processing procedures of a process of identifying a reference area according to the third embodiment. Note that the process of FIG. 25 may be executed after step S302 of FIG. 24, or may be executed periodically.

In step S311, the reference area identifying unit 14 identifies the position of the input cursor. As a result, the position information of the input cursor is acquired. The position information is, for example, coordinate values in the screen coordinate system. Next, the reference area identifying unit 14 acquires one record in an order starting from the newest date, from the fixation area storage unit 122 (step S312). When it is not possible to acquire a record; when processing has ended for all records stored in the fixation area storage unit 122 (NO in step S313), the process of FIG. 25 is ended. When a record (hereinafter, "target record") is acquired (YES in step S313), the reference area identifying unit 14 determines whether the time and date of the target record is within a predetermined time from the present time and date (step S314). This is determined in order to avoid a situation where an area that is referred to at a time exceeding the predetermined time is set as a reference area.

When the time and date of the target record is within a predetermined time (YES in step S314), the reference area identifying unit 14 calculates the distance between the input cursor and the fixation area relevant to the target record (step S315). The method of calculating the distance is not limited to a predetermined method. Note that the fixation area relevant to the target record may be identified based on the identification information (fixation point and radius) of the fixation area stored in the target record.

Next, the reference area identifying unit 14 determines whether the distance is greater than or equal to a threshold β (step S316). The purpose of this determination is the same as step S204 of FIG. 22.

When the distance is greater than or equal to the threshold β (YES in step S316), the reference area identifying unit additionally stores the target record in the reference area storage unit 123 (step S317). That is, the fixation area relevant to the target record is set as the reference area. Note that in step S316, among the records stored in the reference area storage unit 123, a record whose time and date exceeds a predetermined time from the present time and date may be deleted. Furthermore, when the process of FIG. 25 is executed after the process of FIG. 24, the process is to return to step S301 after step S317.

Incidentally, as illustrated in FIG. 23, when the reference area is determined regardless of the structure of the text, there may be a word that crosses over the boundary of the reference area. In FIG. 23, the first word "Pollution" in the first line, the first word "damage" in the second line, etc., are crossing of the boundary of the reference area. In the third embodiment, with respect to a word that crosses over the boundary of the reference area, as the extraction rules for determining whether the word is to be an addition target of the temporary priority in step S154 of FIG. 13, extraction rules as indicated in FIG. 26 may be set.

Figures 26, 27:
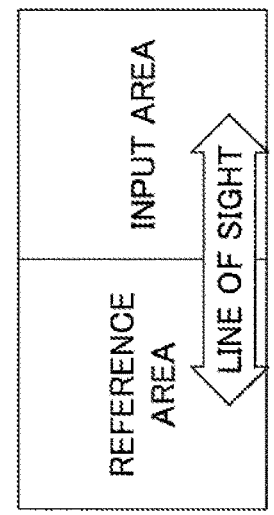
FIG. 26 illustrates an example of extraction rules according to the third embodiment.
FIG. 27 illustrates the items that are considered according to a fourth embodiment.

FIG. 26 illustrates an example of extraction rules according to the third embodiment. In FIG. 26, a third extraction rule is added to the extraction rules of FIG. 14. The third extraction rule is that when 75% percent or more of a word is included in the reference area, the word is set as an addition target of the temporary priority. The ratio with respect to the number of characters included in the word is 75%. For example, in the case of a word having four characters, three or more characters are to be included in the reference area.

Note that the above describes an example where the reference area is a circle; however, the reference area may be a rectangle or other shapes.

Next, a description is given of a fourth embodiment. In the fourth embodiment, the points that are different to those of the above embodiments are described. In the fourth embodiment, the points that are not particularly mentioned may be the same as the above embodiments.

FIG. 27 illustrates the items that are considered according to the fourth embodiment. As illustrated in FIG. 27, when the user is inputting a character string in an input area while referring to a reference area, the user's line of sight is highly likely to move to and fro between the reference area and the input area. In the fourth embodiment, this kind of circumstance is considered, and only when the line of sight is detected to be moving to and fro, the addition of the temporary priority is performed.

In the fourth embodiment, the process of FIG. 18 is replaced by the process of FIG. 28. FIG. 28 is a flowchart of an example of processing procedures executed by the conversion candidate display unit 18 according to the fourth embodiment. In FIG. 28, the same steps as those of FIG. 18 are denoted by the same step numbers and descriptions thereof are omitted.

In FIG. 28, steps S401 through S403 are added between steps S174 and S175. In step S401, the conversion candidate display unit 18 determines whether the fixation point is moving to and fro between the input area and reference area (hereinafter, "reciprocating movement of fixation point"). The determination of whether there is such a movement is made by referring to, for example, the fixation area storage unit 122 and the input area storage unit 129. That is, the fixation area storage unit 122 stores the history of the fixation areas in time series. Furthermore, the input area storage unit 129 stores the input areas. Therefore, by referring to the fixation area storage unit 122 and the input area storage unit 129, it is possible to identify whether each fixation area is outside the input area or inside the input area, in time series. When an identified pattern of time series matches a predetermined pattern, it is determined that there is a reciprocating movement, of the fixation point. A predetermined pattern is, for example, outside input area and inside input area are alternately repeated. Here, alternately does not have to mean in units of records stored in the fixation area storage unit 122. For example, in units of records stored in the fixation area storage unit 122, a pattern in which two continuous records are outside input area, subsequent three continuous records are inside input area, and subsequent three continuous records are outside input area, may be determined as a pattern in which outside input, area and inside input area are alternately repeated. Note that a plurality of types of predetermined patterns may be prepared. Furthermore, information indicating a predetermined pattern may be stored in advance in the secondary storage device 102, etc.

When the conversion candidate display unit 18 determines that there is a reciprocating movement of the fixation point (YES in step S401), the conversion candidate display unit 18 sets the determination mode of the display order of conversion candidates (hereinafter, "display order determination mode") to be the temporary mode (step S402). On the other hand, when the conversion candidate display unit 18 determines that there is no reciprocating movement of the fixation point (NO in step S401), the conversion candidate display unit 18 sets the display order determination mode to be a standard mode (step S403). Note that a temporary mode is a mode where the temporary priority is considered. A standard mode is a mode where only the standard priority is considered.

Furthermore, in FIG. 23, step S404 is added between steps S176 and S177. In step S404, the conversion candidate display unit 18 determines whether the display order determination mode is the temporary mode or the standard mode. When the display order determination mode is the temporary mode (YES in step S404), as described in FIG. 18, step S177 and onward are executed. When the display order determination mode is the standard mode (NO in step S404), step S180 and onward are executed. Therefore, in this case, a priority based on the standard priority is applied to the target word.

As described above, according to the fourth embodiment, it is determined whether the user is inputting characters while referring to another area other than the input area, based on the movement of the line of sight of the user. Only when it is determined that the user is inputting characters while referring to another area other than the input area, the temporary priority is considered, and the order of displaying conversion candidates is determined. Therefore, only when the user is inputting characters while referring to another area other than the input area, it is possible to increase the likelihood of displaying a word, which is included in the area referred to by the user, at a high ranking in the display order of conversion candidates. As a result, it is possible to increase the likelihood of displaying the conversion candidates in a display order in line with the user's expectations.

Note that in the above embodiments, a character string extracted as a reference word and character string of a conversion candidate stored in the candidate dictionary storage unit 128 are described as a word; however, these character strings do not have to be words. For example, the character string may be an example of a sentence.

Note that in the above embodiments, the line of sight input unit 11 is an example of an input unit. The reference word acquiring unit 13 is an example of an acquiring unit. The conversion candidate display unit 18 is an example of a display control unit.

According to an aspect of the embodiments, a conversion device and a conversion method are provided, which are capable of increasing the efficiency of the operation of inputting character strings.

The present invention is not limited to the specific embodiments described herein, and variations and modifications may be made without departing from the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A conversion device comprising:
    a processor configured to execute a process including
    inputting first position information indicating a position of a user's line of sight on a screen,
    determining a fixation point on the screen based on the position of the line of sight which is continuously input from the user and indicated by the first position information, to input second position information indicating a position of the fixation point on the screen,
    acquiring, from among character strings in an image displayed on the screen, one or more character strings having a distance on the screen from the position of the fixation point indicated by the second position information, the distance being less than or equal to a predetermined value,
    storing the one or more character strings as reference words in a first storage unit in association with the position of the fixation point, and
    displaying, in response to an input character received from the user, a list of character strings corresponding to readings of character strings including the input character, among character strings stored in a second storage unit in association with the readings, the list of character strings being displayed as conversion candidates with respect to the input character, wherein
    the displaying includes increasing a priority in a display order for a character string that matches any of the reference words from the first storage unit, among the character strings corresponding to the readings in the list, such that the priority is higher than a priority of a case where the character string does not match any of the reference words from the first storage unit.

2. The conversion device according to claim 1, wherein the displaying includes increasing the priority in the display order for the character string that matches any of the reference words from the first storage unit, among the character strings corresponding to the readings in the list, such that the priority is higher than a priority of a case where the character string does not match any of the reference words from the first storage unit, when the character string is not included in a predetermined range from the input character on the screen.

3. The conversion device according to claim 1, wherein the storing includes storing information indicating a time of acquiring the one or more character strings, in the first storage unit in association with the one or more character strings, and
    the displaying includes increasing the priority in the display order for the character string that matches any of the reference words from the first storage unit and that matches the character string stored in association with the information indicating the time within a predetermined period from when the input character is input, among the character strings corresponding to the readings in the list, such that the priority is higher than a priority of a case where the character string does not match any of the reference words from the first storage unit.

4. The conversion device according to claim 1, wherein the displaying includes increasing the priority in the display order for the character string that matches any of the reference words from the first storage unit, among the character strings corresponding to the readings in the list, such that the priority is higher than a priority of a case where the character string does not match any of the reference words from the first storage unit, when history of the first position information of the line of sight matches a predetermined pattern.

5. The conversion device according to claim 1, wherein the process further includes
    determining the user's style of reading information displayed on the screen, based on history of the first position information of the line of sight, wherein
    the displaying includes increasing the priority in the display order for the character string that matches the last one of the reference words from the first storage unit, among the character strings corresponding to the readings in the list, such that the priority is higher than a priority of a case where the character string does not match any of the reference words from the first storage unit, when a determination result of the determining indicates a predetermined style.

6. A conversion method executed by a computer, the conversion method comprising:
inputting first position information indicating a position of a user's line of sight on a screen;
determining a fixation point on the screen based on the position of the line of sight which is continuously input from the user and indicated by the first position information, to input second position information indicating a position of the fixation point on the screen;
acquiring, from among character strings in an image displayed on the screen, one or more character strings having a distance on the screen from the position of the fixation point indicated by the second position information, the distance being less than or equal to a predetermined value;
storing the one or more character strings as reference words in a first storage unit in association with the position of the fixation point; and
displaying, in response to an input character received from the user, a list of character strings corresponding to readings of character strings including the input character, among character strings stored in a second storage unit in association with the readings, the list of character strings being displayed as conversion candidates with respect to the input character, wherein
the displaying includes increasing a priority in a display order for a character string that matches any of the reference words from the first storage unit, among the character strings corresponding to the readings in the list, such that the priority is higher than a priority of a case where the character string does not match any of the reference words from the first storage unit.

7. The conversion method according to claim 6, wherein the displaying includes increasing the priority in the display order for the character string that matches any of the reference words from the first storage unit, among the character strings corresponding to the readings in the list, such that the priority is higher than a priority of a case where the character string does not match any of the reference words from the first storage unit, when the character string is not included in a predetermined range from the input character on the screen.

8. The conversion method according to claim 6, wherein the storing includes storing information indicating a time of acquiring the one or more character strings, in the first storage unit in association with the one or more character strings, and
the displaying includes increasing the priority in the display order for the character string that matches any of the reference words from the first storage unit and that matches the character string stored in association with the information indicating the time within a predetermined period from when the input character is input, among the character strings corresponding to the readings in the list, such that the priority is higher than a priority of a case where the character string does not match any of the reference words from the first storage unit.

9. The conversion method according to claim 6, wherein the displaying includes increasing the priority in the display order for the character string that matches any of the reference words from the first storage unit, among the character strings corresponding to the readings in the list, such that the priority is higher than a priority of a case where the character string does not match any of the reference words from the first storage unit, when history of the first position information of the line of sight matches a predetermined pattern.

10. The conversion method according to claim 6, further comprising:
determining the user's style of reading information displayed on the screen, based on history of the first position information of the line of sight, wherein
the displaying includes increasing the priority in the display order for the character string that matches the last one of the reference words from the first storage unit, among the character strings corresponding to the readings in the list, such that the priority is higher than a priority of a case where the character string does not match any of the reference words from the first storage unit, when a determination result of the determining indicates a predetermined style.

11. A non-transitory computer-readable recording medium storing a conversion program that causes a computer to execute a process, the process comprising:
inputting first position information indicating a position of a user's line of sight on a screen;
determining a fixation point on the screen based on the position of the line of sight which is continuously input from the user and indicated by the first position information, to input second position information indicating a position of the fixation point on the screen;
acquiring, from among character strings in an image displayed on the screen, one or more character strings having a distance on the screen from the position of the fixation point indicated by the second position information, the distance being less than or equal to a predetermined value;
storing the one or more character strings as reference words in a first storage unit in association with the position of the fixation point; and
displaying, in response to an input character received from the user, a list of character strings corresponding to readings of character strings including the input character, among character strings stored in a second storage unit in association with the readings, the list of character strings being displayed as conversion candidates with respect to the input character, wherein
the displaying includes increasing a priority in a display order for a character string that matches any of the reference words from the first storage unit, among the character strings corresponding to the readings in the list, such that the priority is higher than a priority of a case where the character string does not match any of the reference words from the first storage unit.

12. The non-transitory computer-readable recording medium according to claim 11, wherein
the displaying includes increasing the priority in the display order for the character string that matches any of the reference words from the first storage unit, among the character strings corresponding to the readings in the list, such that the priority is higher than a priority of a case where the character string does not match any of the reference words from the first storage unit, when the character string is not included in a predetermined range from the input character on the screen.

13. The non-transitory computer-readable recording medium according to claim 11, wherein
the storing includes storing information indicating a time of acquiring the one or more character strings, in the first storage unit in association with the one or more character strings, and
the displaying includes increasing the priority in the display order for the character string that matches any of the reference words from the first storage unit and that matches the character string stored in association with the information indicating the time within a predetermined period from when the input character is input, among the character strings corresponding to the readings in the list, such that the priority is higher than a priority of a case where the character string does not match any of the reference words from the first storage unit.

14. The non-transitory computer-readable recording medium according to claim 11, wherein
the displaying includes increasing the priority in the display order for the character string that matches any of the reference words from the first storage unit, among the character strings corresponding to the readings in the list, such that the priority is higher than a priority of a case where the character string does not match any of the reference words from the first storage unit, when history of the first position information of the line of sight matches a predetermined pattern.

15. The non-transitory computer-readable recording medium according to claim 11, the process further comprising:
determining the user's style of reading information displayed on the screen, based on history of the first position information of the line of sight, wherein
the displaying includes increasing the priority in the display order for the character string that matches the last one of the reference words from the first storage unit, among the character strings corresponding to the readings in the list, such that the priority is higher than a priority of a case where the character string does not match any of the reference words from the first storage unit, when a determination result of the determining indicates a predetermined style.

* * * * *